United States Patent
Xu et al.

(10) Patent No.: US 11,778,549 B2
(45) Date of Patent: Oct. 3, 2023

(54) BANDWIDTH PART CONTROL FOR NETWORK POWER SAVING

(71) Applicant: QUALCOMM Incorporated, San Diego, CA (US)

(72) Inventors: Huilin Xu, Temecula, CA (US); Hung Dinh Ly, San Diego, CA (US); Muhammad Sayed Khairy Abdelghaffar, San Jose, CA (US); Hwan Joon Kwon, San Diego, CA (US); Krishna Kiran Mukkavilli, San Diego, CA (US); Yongjun Kwak, San Diego, CA (US); Gokul Sridharan, Sunnyvale, CA (US); Yeliz Tokgoz, San Diego, CA (US); Wanshi Chen, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/460,063

(22) Filed: Aug. 27, 2021

(65) Prior Publication Data
US 2023/0066679 A1 Mar. 2, 2023

(51) Int. Cl.
*H04W 52/02* (2009.01)
*H04W 72/23* (2023.01)
*H04W 72/044* (2023.01)

(52) U.S. Cl.
CPC ... *H04W 52/0206* (2013.01); *H04W 52/0232* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2019/0103953 A1 | 4/2019 | Liao et al. | |
| 2020/0260309 A1* | 8/2020 | Sarkis | H04W 16/14 |
| 2023/0054007 A1* | 2/2023 | Kim | H04L 1/1671 |

OTHER PUBLICATIONS

Huawei, et al., "On Bandwidth Adaptation", 3GPP TSG-RAN WG1 NR Ad-Hoc Meeting, R1-1711424, 3rd Generation Partnership Project, Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 17, 2017, XP051300612, 5 Pages, Proposals 3, 4 and 5, Section 3, Section 1-4, paragraph [0002].
International Search Report and Written Opinion—PCT/US2022/040938—ISA/EPO—dated Dec. 9, 2022.

* cited by examiner

*Primary Examiner* — Alex Skripnikov
(74) *Attorney, Agent, or Firm* — Holland & Hart LLP

(57) ABSTRACT

Methods, systems, and devices for wireless communications are described. In some examples, a base station may send signaling to multiple user equipments (UEs) indicating for the UEs to switch to a radio frequency bandwidth. The UEs may operate according to a reduced set of communication operations in accordance with the radio frequency bandwidth. For example, the UEs may refrain from monitoring one or more channels, may not transmit on one or more channels, or the like. The UEs may switch out of the radio frequency bandwidth based on a trigger event, such as a timer expiring, receiving an indication in a downlink control information (DCI) message, or the like.

30 Claims, 17 Drawing Sheets

BANDWIDTH PART CONTROL FOR NETWORK POWER SAVING

FIELD OF TECHNOLOGY

The following relates to wireless communications, including bandwidth part (BWP) control for network power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support bandwidth part (BWP) control for network power saving. Generally, the described techniques provide for a base station to send an indication of a radio frequency bandwidth, such as a network energy saving BWP, to multiple user equipments (UEs) for a reduced power usage level at the base station. In some examples, a base station may identify a power usage level has surpassed a threshold, and may send signaling to multiple UEs indicating for the UEs to switch to a radio frequency bandwidth. The UEs may operate according to a reduced set of communication operations in accordance with the radio frequency bandwidth. For example, the UEs may refrain from monitoring one or more channels, may not transmit on one or more channels, or the like. The UEs may switch out of the radio frequency bandwidth based on a trigger event, such as a timer expiring, receiving an indication in a downlink control information (DCI) message, or the like.

A method for wireless communication at a UE is described. The method may include receiving, from a base station, signaling indicating for a set of multiple UEs including the UE to use a first radio frequency bandwidth that is configured for a reduced power usage level at the base station, operating according to a reduced set of communication operations in accordance with the first radio frequency bandwidth and the reduced power usage level at the base station, and switching from the first radio frequency bandwidth to a second radio frequency bandwidth for communications with the base station based on a trigger event configured for switching the UE out of the first radio frequency bandwidth.

An apparatus for wireless communication at a UE is described. The apparatus may include a processor, memory coupled with the processor, and instructions stored in the memory. The instructions may be executable by the processor to cause the apparatus to receive, from a base station, signaling indicating for a set of multiple UEs including the UE to use a first radio frequency bandwidth that is configured for a reduced power usage level at the base station, operate according to a reduced set of communication operations in accordance with the first radio frequency bandwidth and the reduced power usage level at the base station, and switch from the first radio frequency bandwidth to a second radio frequency bandwidth for communications with the base station based on a trigger event configured for switching the UE out of the first radio frequency bandwidth.

Another apparatus for wireless communication at a UE is described. The apparatus may include means for receiving, from a base station, signaling indicating for a set of multiple UEs including the UE to use a first radio frequency bandwidth that is configured for a reduced power usage level at the base station, means for operating according to a reduced set of communication operations in accordance with the first radio frequency bandwidth and the reduced power usage level at the base station, and means for switching from the first radio frequency bandwidth to a second radio frequency bandwidth for communications with the base station based on a trigger event configured for switching the UE out of the first radio frequency bandwidth.

A non-transitory computer-readable medium storing code for wireless communication at a UE is described. The code may include instructions executable by a processor to receive, from a base station, signaling indicating for a set of multiple UEs including the UE to use a first radio frequency bandwidth that is configured for a reduced power usage level at the base station, operate according to a reduced set of communication operations in accordance with the first radio frequency bandwidth and the reduced power usage level at the base station, and switch from the first radio frequency bandwidth to a second radio frequency bandwidth for communications with the base station based on a trigger event configured for switching the UE out of the first radio frequency bandwidth.

In some examples of the method, apparatuses, and non-transitory computer-readable medium described herein, receiving the signaling may include operations, features, means, or instructions for receiving a first DCI message including the signaling during an active time of a discontinuous reception (DRX) cycle at the UE, where the first DCI message includes a group-based DCI message corresponding to the set of multiple UEs.

Some examples of the method, apparatuses, and non-transitory computer-readable medium described herein may further include operations, features, means, or instructions for monitoring for the first DCI message based on receiving a second DCI message during an inactive time of the DRX cycle including an indication of the first radio frequency bandwidth, receiving an indication of the reduced power usage level from the base station, a configured monitoring periodicity, or a combination thereof.

In some examples of the method, apparatuses, and non-transitory computer-readable medium described herein, receiving the signaling may include operations, features, means, or instructions for receiving, during an inactive time of a DRX cycle at the UE, a first DCI message, where the first DCI message may be multiplexed with a second DCI message in a same search space set occasion, at least one of the first DCI message, the second DCI message, or both including the signaling.

In some examples of the method, apparatuses, and non-transitory computer-readable medium described herein, the first DCI message corresponds to a first radio network temporary identifier (RNTI) and the second DCI message corresponds to a second RNTI different from the first RNTI.

In some examples of the method, apparatuses, and non-transitory computer-readable medium described herein, the first DCI message includes a first number of fields and the second DCI message includes a second number of fields and the first number of fields may be less than the second number of fields.

In some examples of the method, apparatuses, and non-transitory computer-readable medium described herein, the second DCI message includes one or more parameters of the first DCI message.

In some examples of the method, apparatuses, and non-transitory computer-readable medium described herein, the first DCI message includes a cell group indication including a single bit indicator per cell group.

In some examples of the method, apparatuses, and non-transitory computer-readable medium described herein, the first DCI message includes a field to update a configuration corresponding to the DRX cycle and the field includes a new inactive time with a duration longer than the inactive time.

Some examples of the method, apparatuses, and non-transitory computer-readable medium described herein may further include operations, features, means, or instructions for receiving, on a reference cell of a set of multiple serving cells for the UE, a reference cell configuration for monitoring for the signaling, where receiving the signaling may be based on the reference cell configuration.

In some examples of the method, apparatuses, and non-transitory computer-readable medium described herein, switching from the first radio frequency bandwidth to the second radio frequency bandwidth may include operations, features, means, or instructions for determining a timer corresponding to the reduced power usage level at the base station may have expired, where, a duration of the timer may be configured at the UE, and the trigger event includes expiration of the timer.

In some examples of the method, apparatuses, and non-transitory computer-readable medium described herein, switching from the first radio frequency bandwidth to the second radio frequency bandwidth may include operations, features, means, or instructions for receiving an indication of a slot, subframe, frame, or a combination thereof in which to switch from the first radio frequency bandwidth to the second radio frequency bandwidth, where the trigger event may be the slot, subframe, frame or the combination thereof.

Some examples of the method, apparatuses, and non-transitory computer-readable medium described herein may further include operations, features, means, or instructions for transmitting, to the base station and prior to operating according to the reduced set of communication operations, a feedback message based on the received signaling.

Some examples of the method, apparatuses, and non-transitory computer-readable medium described herein may further include operations, features, means, or instructions for transmitting, to the base station and while operating according to the reduced set of communication operations, a feedback message based on the received signaling.

Some examples of the method, apparatuses, and non-transitory computer-readable medium described herein may further include operations, features, means, or instructions for receiving the signaling from a reference cell of a set of multiple serving cells for the UE, the reference cell including a primary cell for the UE, a common cell for the set of multiple UEs, or both.

In some examples of the method, apparatuses, and non-transitory computer-readable medium described herein, operating according to the reduced set of communication operations may include operations, features, means, or instructions for refraining from monitoring an uplink shared channel, a downlink shared channel, an uplink control channel, a downlink control channel, one or more reference signals, one or more synchronization signal blocks, or a combination thereof.

In some examples of the method, apparatuses, and non-transitory computer-readable medium described herein, operating according to the reduced set of communication operations may include operations, features, means, or instructions for monitoring the first radio frequency bandwidth for control signaling from the base station, the control signaling indicating for the UE to switch from the first radio frequency bandwidth to the second radio frequency bandwidth.

In some examples of the method, apparatuses, and non-transitory computer-readable medium described herein, operating according to the reduced set of communication operations may include operations, features, means, or instructions for performing a random access channel procedure with a reference cell of a set of multiple serving cells for the UE.

Some examples of the method, apparatuses, and non-transitory computer-readable medium described herein may further include operations, features, means, or instructions for receiving a configuration indicating the second radio frequency bandwidth.

In some examples of the method, apparatuses, and non-transitory computer-readable medium described herein, the second radio frequency bandwidth may be a same radio frequency bandwidth for communications with the base station prior to receiving the signaling.

In some examples of the method, apparatuses, and non-transitory computer-readable medium described herein, the first radio frequency bandwidth may be common to the set of multiple UEs and the second radio frequency bandwidth may be specific to the UE.

In some examples of the method, apparatuses, and non-transitory computer-readable medium described herein, the first radio frequency bandwidth may be narrower than the second radio frequency bandwidth.

A method for wireless communication at a base station is described. The method may include transmitting, to a set of multiple UEs, first signaling indicating for the set of multiple UEs to use a first radio frequency bandwidth that is configured for a reduced power usage level at the base station, operating according to a reduced set of communication operations in accordance with the first radio frequency bandwidth and the reduced power usage level at the base station, and transmitting, to the set of multiple UEs, an indication of a trigger event configured for switching the set of multiple UEs from the first radio frequency bandwidth to at least a second radio frequency bandwidth for communications with the base station.

An apparatus for wireless communication at a base station is described. The apparatus may include a processor, memory coupled with the processor, and instructions stored in the memory. The instructions may be executable by the processor to cause the apparatus to transmit, to a set of multiple UEs, first signaling indicating for the set of multiple UEs to use a first radio frequency bandwidth that is configured for a reduced power usage level at the base station, operate according to a reduced set of communication operations in accordance with the first radio frequency bandwidth and the reduced power usage level at the base station, and transmit, to the set of multiple UEs, an indication of a trigger event configured for switching the set of multiple UEs from the first radio frequency bandwidth to at least a second radio frequency bandwidth for communications with the base station.

Another apparatus for wireless communication at a base station is described. The apparatus may include means for transmitting, to a set of multiple UEs, first signaling indicating for the set of multiple UEs to use a first radio frequency bandwidth that is configured for a reduced power usage level at the base station, means for operating according to a reduced set of communication operations in accordance with the first radio frequency bandwidth and the reduced power usage level at the base station, and means for transmitting, to the set of multiple UEs, an indication of a trigger event configured for switching the set of multiple UEs from the first radio frequency bandwidth to at least a second radio frequency bandwidth for communications with the base station.

A non-transitory computer-readable medium storing code for wireless communication at a base station is described. The code may include instructions executable by a processor to transmit, to a set of multiple UEs, first signaling indicating for the set of multiple UEs to use a first radio frequency bandwidth that is configured for a reduced power usage level at the base station, operate according to a reduced set of communication operations in accordance with the first radio frequency bandwidth and the reduced power usage level at the base station, and transmit, to the set of multiple UEs, an indication of a trigger event configured for switching the set of multiple UEs from the first radio frequency bandwidth to at least a second radio frequency bandwidth for communications with the base station.

In some examples of the method, apparatuses, and non-transitory computer-readable medium described herein, transmitting the first signaling may include operations, features, means, or instructions for transmitting a first DCI message including the first signaling during an active time of a DRX cycle at the UE, where the first DCI message includes a group-based DCI message corresponding to the set of multiple UEs.

Some examples of the method, apparatuses, and non-transitory computer-readable medium described herein may further include operations, features, means, or instructions for transmitting, to the set of multiple UEs, a second DCI message during an inactive time of the DRX cycle including an indication of the first radio frequency bandwidth, an indication of the reduced power usage level, a monitoring precocity configuration, or a combination thereof.

In some examples of the method, apparatuses, and non-transitory computer-readable medium described herein, transmitting the first signaling may include operations, features, means, or instructions for transmitting, during an inactive time of a DRX cycle at the UE, a first DCI message, where the first DCI message may be multiplexed with a second DCI message in a same search space set occasion, at least one of the first DCI message, the second DCI message, or both including the first signaling.

In some examples of the method, apparatuses, and non-transitory computer-readable medium described herein, the first DCI message corresponds to a first RNTI and the second DCI message corresponds to a second RNTI different from the first RNTI.

In some examples of the method, apparatuses, and non-transitory computer-readable medium described herein, the first DCI message includes a first number of fields and the second DCI message includes a second number of fields and the first number of fields may be less than the second number of fields.

In some examples of the method, apparatuses, and non-transitory computer-readable medium described herein, the second DCI message includes one or more parameters of the first DCI message.

In some examples of the method, apparatuses, and non-transitory computer-readable medium described herein, the first DCI message includes a cell group indication including a single bit indicator per cell group.

In some examples of the method, apparatuses, and non-transitory computer-readable medium described herein, the first DCI message includes a field to update a configuration corresponding to the DRX cycle and the field includes a new inactive time with a duration longer than the inactive time.

Some examples of the method, apparatuses, and non-transitory computer-readable medium described herein may further include operations, features, means, or instructions for transmitting, on a reference cell of a set of multiple serving cells for the UE, a reference cell configuration for the first signaling, where transmitting the first signaling may be based on the reference cell configuration.

Some examples of the method, apparatuses, and non-transitory computer-readable medium described herein may further include operations, features, means, or instructions for transmitting, to the UE, a timer configuration for switching from the first radio frequency bandwidth to the second radio frequency bandwidth, where the trigger event includes expiration of a timer associated with the timer configuration.

In some examples of the method, apparatuses, and non-transitory computer-readable medium described herein, transmitting the indication of the trigger event may include operations, features, means, or instructions for transmitting an indication of a slot, subframe, frame, or a combination thereof in which to switch from the first radio frequency bandwidth to the second radio frequency bandwidth, where the trigger event may be the slot, subframe, frame or the combination thereof.

Some examples of the method, apparatuses, and non-transitory computer-readable medium described herein may further include operations, features, means, or instructions for receiving, from at least one UE of the set of multiple UEs and prior to operating according to the reduced set of communication operations, a feedback message based on transmitting the first signaling.

Some examples of the method, apparatuses, and non-transitory computer-readable medium described herein may further include operations, features, means, or instructions for receiving, from at least one UE of the set of multiple UEs and while operating according to the reduced set of communication operations, a feedback message based on transmitting the first signaling.

Some examples of the method, apparatuses, and non-transitory computer-readable medium described herein may further include operations, features, means, or instructions for transmitting the first signaling from a reference cell of a set of multiple serving cells for the UE, the reference cell including a primary cell for the UE, a common cell for the set of multiple UEs, or both.

In some examples of the method, apparatuses, and non-transitory computer-readable medium described herein, operating according to the reduced set of communication operations may include operations, features, means, or instructions for refraining from transmitting second signaling including an uplink shared channel, a downlink shared channel, an uplink control channel, a downlink control channel, one or more reference signals, one or more synchronization signal blocks, or a combination thereof.

In some examples of the method, apparatuses, and non-transitory computer-readable medium described herein, operating according to the reduced set of communication operations may include operations, features, means, or instructions for transmitting, to at least one UE of the set of multiple UEs, second signaling according to the first radio frequency bandwidth, the second signaling indicating for the UE to switch from the first radio frequency bandwidth to the second radio frequency bandwidth.

In some examples of the method, apparatuses, and non-transitory computer-readable medium described herein, operating according to the reduced set of communication operations may include operations, features, means, or instructions for performing a random access channel procedure with a reference cell of a set of multiple serving cells for the UE.

Some examples of the method, apparatuses, and non-transitory computer-readable medium described herein may further include operations, features, means, or instructions for transmitting a configuration indicating the second radio frequency bandwidth.

In some examples of the method, apparatuses, and non-transitory computer-readable medium described herein, the second radio frequency bandwidth may be a same radio frequency bandwidth for communications with the UE prior to transmitting the first signaling.

In some examples of the method, apparatuses, and non-transitory computer-readable medium described herein, the first radio frequency bandwidth may be common to the set of multiple UEs and the second radio frequency bandwidth may be specific to a UE of the set of multiple UEs.

In some examples of the method, apparatuses, and non-transitory computer-readable medium described herein, the first radio frequency bandwidth may be narrower than the second radio frequency bandwidth.

DETAILED DESCRIPTION

In some wireless communications systems, a base station may communicate with multiple wireless devices (e.g., multiple user equipments (UEs)) using different radio frequency bandwidths. For example, a UE and a base station may communicate using a bandwidth part (BWP) with a frequency bandwidth. The UE may operate according to a discontinuous reception (DRX) cycle to reduce power consumption by switching between an active BWP and a dormant BWP during an active duration of the DRX cycle and an inactive duration of the DRX cycle, respectively. If the base station is communicating with multiple UEs, the base station may have a relatively high power consumption when compared with the communications. However, the base station may not have a method for reducing power consumption.

In some examples, a base station may switch multiple UEs to a radio frequency bandwidth to save power, which may be referred to as a network energy saving BWP. For example, the base station may transmit signaling to multiple UEs indicating for the UEs to enter the network energy saving BWP. In some cases, the UEs may operate according to a reduced set of communication operations while operating in the network energy saving BWP. The reduced set of communication operations may control monitoring of uplink and downlink channels, may provide additional conditions for random access procedures, may reduce a number of synchronization signal blocks (SSBs), or a combination thereof. In some cases, the signaling may vary depending on whether the UE is in an active duration of a DRX cycle or an inactive duration of the DRX cycle. For example, while the UE is in an active duration of the DRX cycle, a base station may send a UE-specific downlink control information (DCI) message including the indication of the network energy saving BWP. In some other examples, while the UE is in an inactive duration of the DRX cycle, a base station may send one or more DCI messages across multiple UEs multiplexed in a same search space set occasion. In some cases, the UE may switch from the network energy saving BWP to another BWP (e.g., the BWP the UE was using before switching into the network energy saving BWP or a configured BPW) based on a trigger event. The trigger event may be based on a timer expiring at the UE, a configured slot, subframe, or frame, or both.

Aspects of the disclosure are initially described in the context of wireless communications systems. Aspects of the disclosure are then described in the context of a resource diagram and a process flow. Aspects of the disclosure are further illustrated by and described with reference to apparatus diagrams, system diagrams, and flowcharts that relate to BWP control for network power saving.

Figure 1:
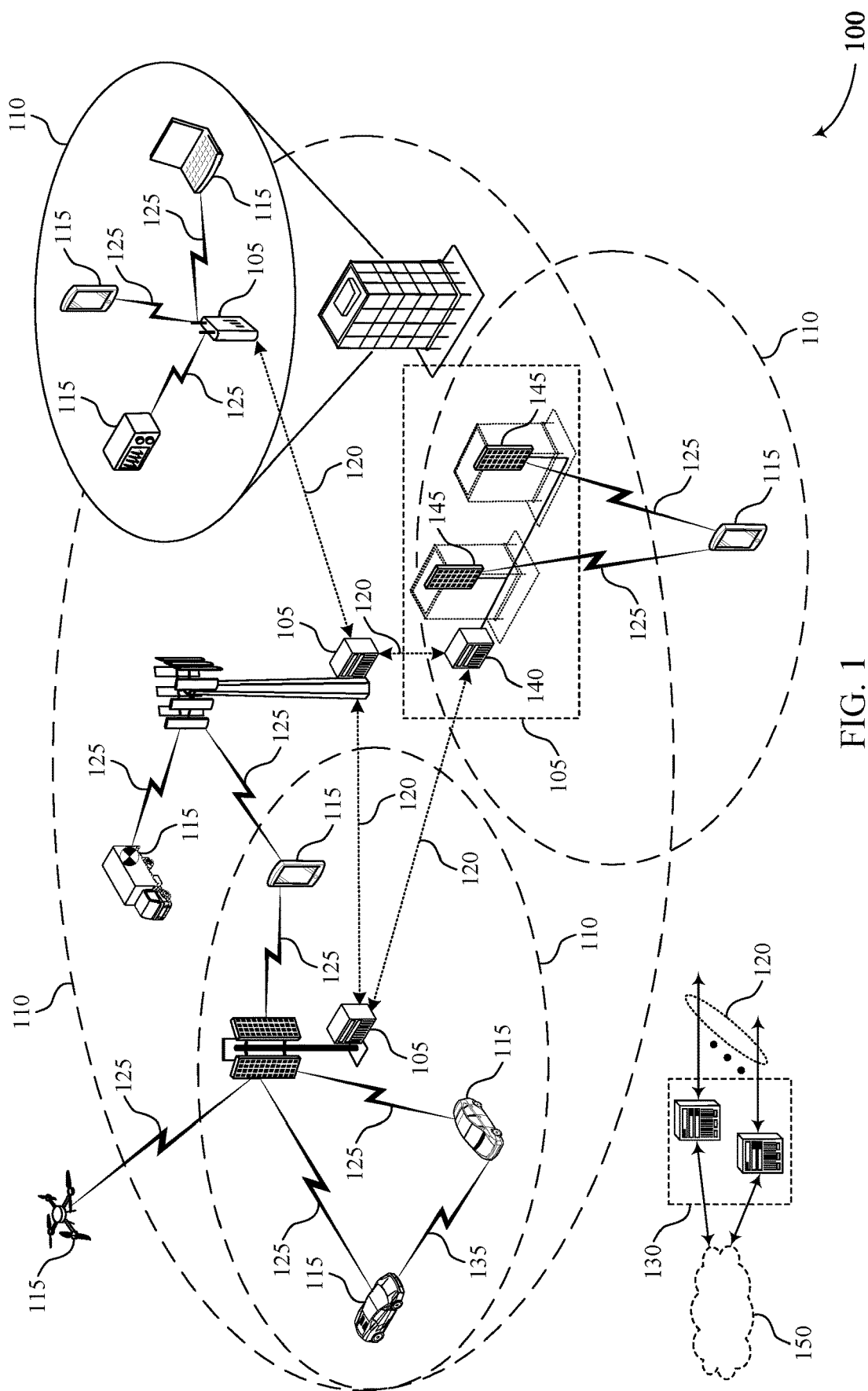
FIGS. 1 through 3 illustrate examples of wireless communications systems that support bandwidth part (BWP) control for network power saving in accordance with aspects of the present disclosure.

FIG. 1 illustrates an example of a wireless communications system 100 that supports BWP control for network power saving in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may communicate with multiple UEs 115, each UE 115 operating according to a DRX cycle. If the DRX cycles of the UEs 115 align, the base station 105 may communicate control signaling and data with the multiple UEs 115 concurrently, which may overload the base station 105 (e.g., due to traffic load surpassing a threshold). In some cases, to achieve network power saving, multiple UEs 115 in communication with a base station 105 (e.g., a cell) may switch to a same BWP, which may be referred to as a network energy saving BWP. In some cases, a base station 105 may transmit control signaling to one or more UEs 115 to switch from a UE-specific BWP (e.g., an active BWP or a dormant BWP of each UE 115) to a network energy saving BWP. In some examples, a single BWP switching DCI may be used to switch UEs 115 in communication with the base station 105 into a same BWP both outside and inside a UE DRX cycle active time.

Figure 2:
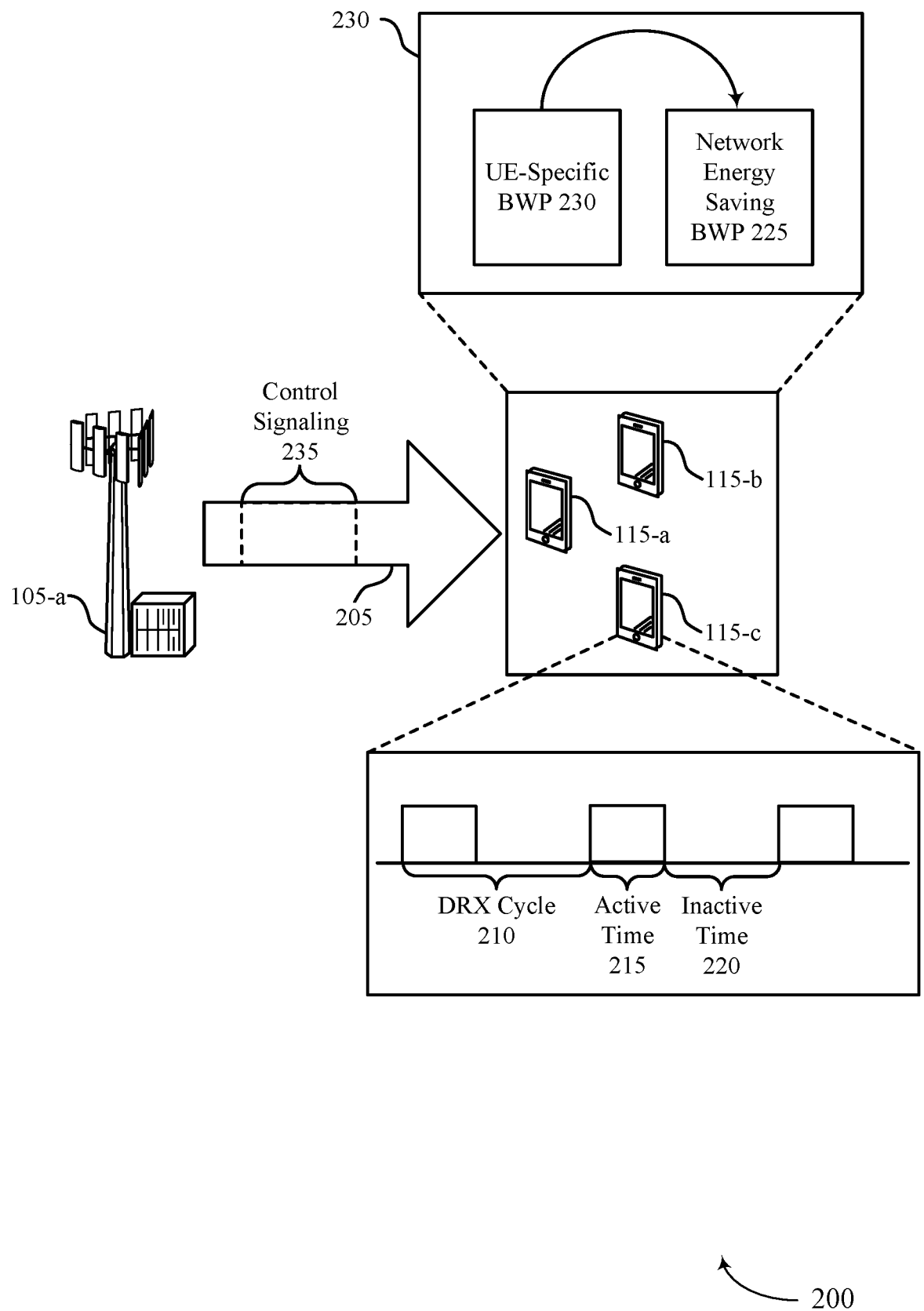

FIG. 2 illustrates an example of a wireless communications system 200 that supports BWP control for network power saving in accordance with aspects of the present disclosure. In some examples, wireless communications system 200 may implement aspects of wireless communications system 100 and may include a UE 115-a, a UE 115-b, a UE 115-c, and a base station 105-a which may be examples of UEs 115 and a base station 105 as described with reference to FIG. 1. In some examples, base station 105-a and one or more UEs 115, such as UE 115-a, UE 115-b, and UE 115-c, may communicate control information, data, or both using a downlink communication link 205. For example, base station 105-a may transmit an indication of a radio frequency bandwidth configured for reduced power consumption at base station 105-a to UE 115-a, UE 115-b, and UE 115-c.

In some cases, a wireless device may communicate with multiple wireless devices (e.g., multiple UEs 115) using different radio frequencies according to radio frequency bandwidths. Each radio frequency bandwidth may include a frequency range within a frequency band. Further, wireless devices may communicate within a frequency band using a BWP frequency allocation allowing for multiple signal types to be sent within a frequency bandwidth. For example, a UE 115 and a base station 105 may communicate using a contiguous set of physical resource blocks (PRBs) on a carrier defined by a BWP within a frequency bandwidth, where each carrier may have a carrier frequency for UEs 115 operating using the carrier. Further, multiple BWPs may be configured differently based on signal characteristics to support varying functions, services, energy constraints, or the like. For example, base station 105-a may communicate with UE 115-a, UE 115-b, and UE 115-c within a radio frequency bandwidth based on signal characteristics of a downlink communication link 205.

A frequency range (e.g., a bandwidth) of a BWP may be a factor for UE power consumption. For example, UE power saving may linearly decrease when the BWP bandwidth decreases. Further, configuration of a UE 115 for receiving a downlink channel, such as a physical downlink shared channel (PDSCH) or a physical downlink control channel (PDCCH), may be encapsulated in a BWP configuration, which may provide for additional power savings at the UE 115. In some cases, BWP bandwidth may be scaled linearly for one or more frequencies (e.g., frequencies in Frequency Range 1 (FR1), which may include Sub-6 GHz frequency bands). The linear scaling may provide for the UE 115 to reduce power consumption by adjusting BWP bandwidth (e.g., according to X MHz=0.4+0.6*(X−20)/80, where the UE 115 may use linear interpolation for intermediate bandwidths and X=10, 20, 40, 80, and 100). If the power consumption at the UE 115 after scaling is smaller than a BWP transition power, the UE 115 may use the BWP transition power as the output of scaling.

In some cases, a UE 115 may operate according to a discontinuous reception (DRX) cycle 210, which may include an active time 215 and an inactive time 220. The UE 115 may switch between BWPs according to the DRX cycle 210 to reduce power consumption while the UE 115 is in an inactive time 220. For example, a UE 115 may switch from an active BWP to a dormant BWP for an inactive duration, or inactive time 220, of the DRX cycle 210, and may switch from the dormant BWP to the active BWP for an active duration, or active time 215, of the DRX cycle 210 (e.g., for secondary cell (SCell) communication). For example, UE 115-a may operate according to a DRX cycle 210, which may be configured by base station 105-a. The DRX cycle 210 may repeat according to a periodicity. During active time 215, UE 115-a may operate in an active BWP or a dormant BWP, and upon entering an inactive time 220, may switch to a different BWP. While using the dormant BWP, UE 115-a may reduce power consumption by reducing communication operations. In some examples, such as for UE power saving, a dormant BWP may have a smaller bandwidth than a non-dormant BWP, and dormant BWPs may be configured per UE 115. That is, each UE 115 may enter a different dormant BWP according to the DRX cycle 210 of each UE 115. Further, UEs 115 of different types may be configured with different dormant BWPs with different bandwidths. While in a dormant BWP, a UE 115 may not receive one or more downlink channels (e.g., a PDCCH and a PDSCH) and may receive a reduced number of signals (e.g., channel state information (CSI) measurement and sounding reference signal (SRS) transmissions).

A UE 115 may switch to a non-dormant BWP when exiting a dormant mode, such as when exiting inactive time 220. In some cases, the UE 115 may receive signaling, such as a downlink control information (DCI) message, including an explicit field indicating for the UE 115 to switch from an active BWP to a dormant BWP. Similarly, the UE 115 may receive signaling indicating for the UE 115 to switch from a dormant BWP to an active BWP according to a DRX cycle or independent of the DRX cycle of the UE 115. For example, the UE 115 may receive signaling (e.g., Layer 1 (L1) signaling) with an SCell dormancy indication from a primary cell (PCell), the SCell dormancy indication indicating a switch to or from a dormant BWP configured for the SCell. In some cases, when a UE 115 operates outside a DRX active time 215 (e.g., during an inactive time 220), the explicit information field may be a wake-up signal (WUS) included in a downlink control channel (e.g., a DCI, such as DCI format 2_6, with a power saving-radio network temporary identifier (PS-RNTI) in a PDCCH). To keep the size of the WUS relatively small (e.g., reduce the number of bits in the DCI message), multiple dormancy indications, such as up to 5 SCell groups, may be defined within a signal with a UE-specific field associated to each UE 115.

In some cases, when a UE 115 operates within DRX active time 215, the explicit information field may be in non-fallback DCI (e.g., DCI format 0_1 or format 1_1). In some examples, the network may configure the DCI to schedule data and provide a dormancy indication (e.g., SCell dormancy indication). In some other examples, the DCI may be configured to provide the dormancy indication (e.g., without scheduling data). However, a base station 105 may communicate with multiple UEs 115, each UE 115 operating according to a DRX cycle, which may overload the base station 105 (e.g., due to traffic load surpassing a threshold).

In some cases, to achieve network power saving, multiple UEs 115 in communication with a base station 105 (e.g., a cell) may switch to a same BWP, which may be referred to as a network energy saving BWP 225. In some cases, the network energy saving BWP 225 may be an initial downlink BWP. For example, a base station 105-a may transmit control signaling 235 to one or more UEs 115, such as UE 115-a, UE 115-b, UE 115-c, or a combination thereof to switch from a UE-specific BWP 230 (e.g., an active BWP or a dormant BWP of each UE 115) to a network energy saving BWP 225. In some examples, a single BWP switching DCI may be used to switch UEs 115 in communication with base station 105-a into a same BWP inside a UE DRX cycle active time 215.

In some cases, for UE power saving, a base station 105 may transmit individual DCIs to multiple UEs 115 to trigger the UEs 115 to switch to multiple UE energy saving BWPs (e.g., dormant BWPs) for traffic offloading at the UE 115, where the UE energy saving BWP may be a narrow BWP contained within a wider, non-energy saving BWP. Therefore, the traffic load may be controlled on a per-user basis. However, for network power saving, a base station 105 may transmit a single DCI to multiple UEs 115 to trigger the UEs 115 to switch to a same network energy saving BWP 225 (e.g., a narrow BWP shared by the UEs 115). Thus, the traffic load may be controlled for each UE 115 in communication with a base station 105 (e.g., in a coverage area of the base station 105). For example, at 230, base station 105-a may indicate for UE 115-a through UE 115-c to switch from a UE-specific BWP 230 to a network energy saving BWP 225. The network energy saving BWP 225 may be configured for a shared set of signaling conditions, functions, or the like, thus controlling the traffic load for UEs 115 in communication with base station 105-a.

While functioning in a network energy saving BWP 225, a UE 115 may operate according to a reduced set of communication operations. For example, a UE 115 may not transmit one or more uplink channels or one or more uplink signals, such as a physical uplink shared channel (PUSCH), physical uplink control channel (PUCCH), SRS, or CSI and may not receive one or more downlink channels or one or more downlink signals PDSCH, PDCCH, CSI-RS, or a tracking reference signal (TRS). Additionally or alternatively, the UE 115 may perform a random access channel (RACH) procedure on a single cell (e.g., a reference cell) and SSB occasions may be reduced. In some cases, the UE 115 may monitor for control signaling 235, which may be a DCI message, while operating according to the reduced set of communication operations on the network energy saving BWP 225 (e.g., in at most one BWP). In some cases, UE 115 behavior in a network energy saving BWP may be different (e.g., less active) than that in a dormant BWP.

Figure 3:
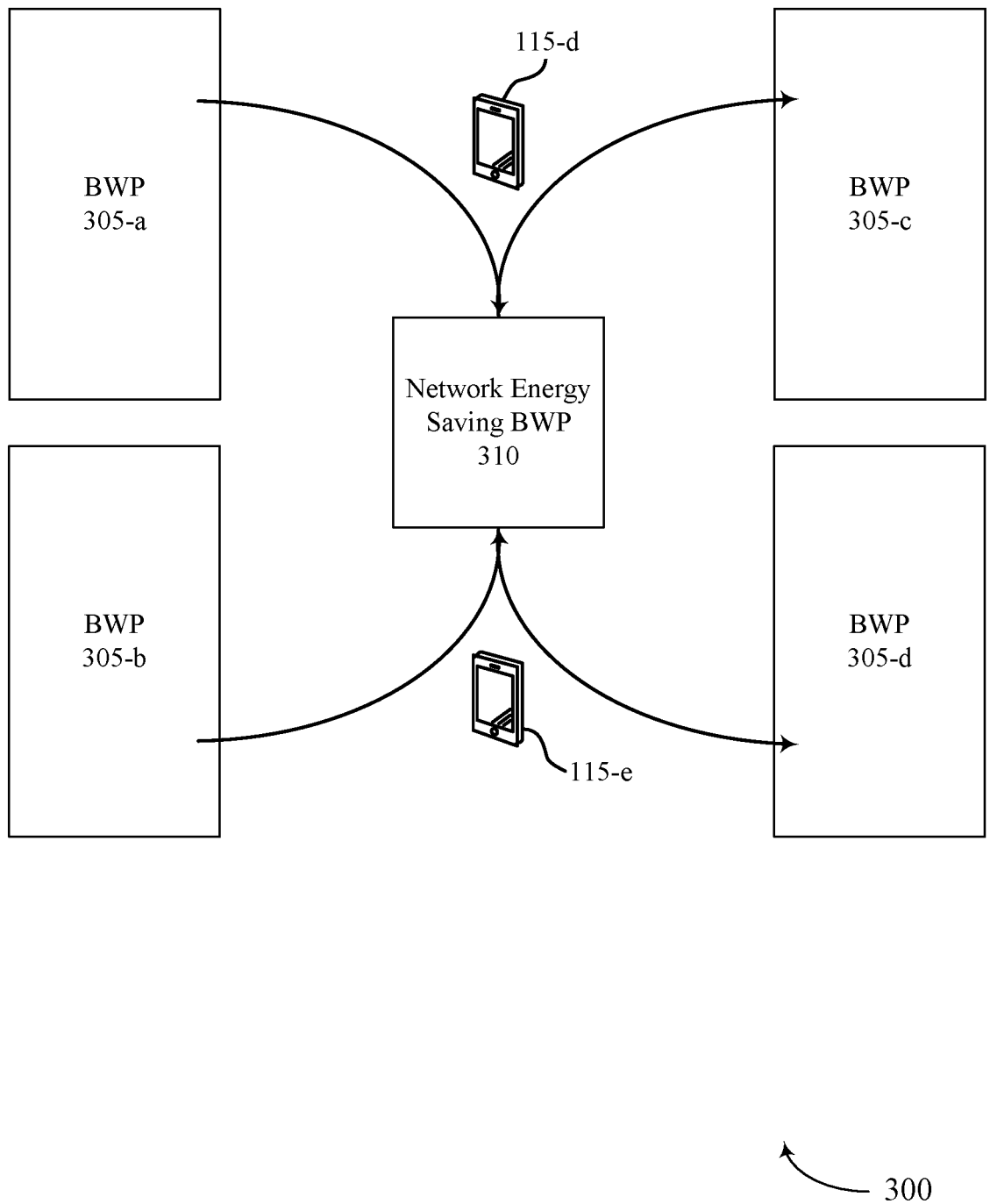

FIG. 3 illustrates an example of a wireless communications system 300 that supports BWP control for network power saving in accordance with aspects of the present disclosure. In some examples, wireless communications system 300 may implement aspects of wireless communications system 100 and wireless communication system 200 and may include a UE 115-d and a UE 115-e which may be examples of UEs 115 as described with reference to FIGS. 1 and 2. In some examples, one or more UEs 115 may switch between a non-network energy saving BWP, such as BWP 305-a, BWP 305-b, or both and a network energy saving BWP 310 to support energy saving at a base station, such as a base station 105 as described with reference to FIG. 2. The term BWP may refer to a radio frequency bandwidth as described with reference to FIG. 2.

In some examples, a base station may communicate with multiple UEs 115, which may cause the base station to become overloaded or may otherwise cause increased power consumption at the base station. The base station may enter an energy saving mode to reduce power consumption at the base station. Prior to entering the energy saving mode, the base station may send control signaling to the UEs 115 indicating a network energy saving BWP 310, as described with reference to FIG. 2. In some cases, the UEs 115, such as UE 115-d and UE 115-e, may switch from a UE-specific BWP 305 to the common network energy saving BWP 310 based on the control signaling. In some cases, a trigger event at a UE 115 may initiate a BWP switch, such that the UE 115 switches from the network energy saving BWP 310 to another BWP 305. For example, UE 115-d may switch from network energy saving BWP 310 to BWP 305-c, while UE 115-e may switch from network energy saving BWP 310 to BWP 305-d.

In some cases, when a UE 115 exits a network energy saving BWP 310, a non-network energy saving BPW 305 may be configured at the UE 115 after a network or base station exits an energy saving state or mode. For example, the non-network energy saving BWP 305 may be configured by the base station, may be defined at the UE 115, or may be otherwise configured at the UE 115. BWP 305-c may be configured at UE 115-d and BWP 305-d may be configured at UE 115-e. That is, BWP 305-a may be different than BWP 305-c, and BWP 305-b may be different than BWP 305-d. In some other cases, a UE 115 may return to a previous BWP 305, such as a same BWP 305 as before the UE 115 entered the network energy saving BWP 310. For example, UE 115-d may switch from BWP 305-a and UE 115-e may switch from BWP 305-b to network energy saving BWP 310 based on a serving base station entering an energy saving mode or state. When the serving base station exits the energy saving mode or state, UE 115-a may switch to BWP 305-c, which may be the same as BWP 305-a, while UE 115-b may switch to BWP 305-d, which may be the same as BWP 305-b. That is, BWP 305-a may be the same as BWP 305-c, and BWP 305-b may be the same as BWP 305-d.

Further, a network energy saving BWP 310 may be common for multiple UEs 115 in communication with a serving base station. For example, network energy saving BWP 310 may be common for both UE 115-d and UE 115-e. In some cases, a non-network energy saving BWP 305 a UE 115 switches to after the network energy saving BWP 310 may be UE-specific. For example, if the traffic load at a serving base station is frequency division multiplexed for each UE 115, such as UE 115-d and UE 115-e, BWP 305-c and BWP 305-d may be UE-specific (e.g., different BWPs 305). In some cases, a first non-dormant BWP for a UE 115 entering an active time of a DRX cycle may be the same as the first non-network energy saving BWP 305 (e.g., for SCells). A dormant BWP may not have the same BWP identifier (ID) as a network energy saving BWP 310. In some other cases, such as for PCells, the first non-dormant BWP for a UE 115 may not be the same as the first non-network energy saving BWP 305. In some examples, a network energy saving BWP 310 and a first non-network energy saving BWP 305 may be defined at a UE 115 (e.g., for a PCell due to lack of dormancy behavior).

In some examples, if a UE 115 is outside a DRX active time (e.g., in an inactive time) when a base station transmits control signaling for the UE 115 to enter or exit the network energy saving BPW 310, the base station may use a single DCI message (e.g., with a smaller size) to switch multiple UEs 115 to or from a same BWP, such as the network energy saving BPW 310. For example, when a UE 115 operates outside the DRX active time, a base station or network may define a new DCI to increase efficiency related to BWP switching into or out of a network energy saving BPW 310, which is described in further detail with respect to FIG. 4. The UE 115 may switch to a different BWP on a PCell for PCell energy saving. In some cases, the UE 115 may adjust a DRX configuration based on receiving the DCI message. For example, UE 115-d, UE 115-e, or both may adjust a DRX cycle to allow for network energy saving, which may include refraining from entering an active mode while operating in the network energy saving BWP 310.

In some cases, if a UE 115 is inside a DRX active time when a base station transmits control signaling for the UE 115 to enter or exit the network energy saving BWP 310, the base station may use a group-based DCI message (e.g., rather than a UE-specific DCI message) to switch UEs 115 to or from the network energy saving BWP 310. For example, the base station may define the group-based DCI message for more efficient BWP switching into and out of the network energy saving BWP 310 (e.g., when compared with dormancy indications applicable to SCells). In some examples, the base station may scramble the DCI message by a non-cell-RNTI (non-C-RNTI), such that multiple UEs 115 may receive the same DCI message to switch to the network energy saving BWP 310. For example, if UE 115-d and UE 115-e are operating in a DRX active time, they may receive a same DCI message and switch to the network energy saving BWP 310.

In some cases, the content of the group-based DCI message (e.g., the new DCI format as defined for outside the DRX active time, as described with reference to FIG. 4) may be re-used for within the DRX active time with modifications. For example, the synchronization signal (SS) set may be the same as the common SS set for an existing non-UE specific DCI (e.g., Type0/0A/1/2/3-PDCCH CSS). Further, the DCI size may be aligned with an existing non-UE specific DCI to avoid an increase in blind detection. Additionally or alternatively, a separate set of cell groups may be defined than that for the DCI message for outside the DRX active time and a separate first non-network energy saving BWP 305 may be defined than for the DCI message for outside the DRX active time.

In some examples, to reduce UE 115 overhead for monitoring for the DCI message, the DCI message used while a UE functions inside the DRX active time may be monitored under new conditions. In some cases, when sharing an SS set with the existing DCI messages, the occurrence of the SS set occasion may be frequent (e.g., once every slot) to reduce the monitoring efforts of the UE 115 for the DCI message. For example, UE 115-d, UE 115-e, or both may monitor for the DCI message if UE 115-d or UE 115-e has received a network energy power saving DCI message outside an active time that indicates network energy operation may be triggered on one or more cells. In some cases, a UE 115 may monitor for the DCI message if a serving cell or base station operates in a network power energy operation mode. Therefore, a UE 115 may start to monitor for the DCI message when a network indicates that a base station may be performing network energy saving operations on one or more cells. Additionally or alternatively, a separate monitoring periodicity of the DCI message may be defined at UE 115-d, UE 115-e, or both. The periodicity may be longer than the periodicity of the SS set shared with other existing DCI messages to supper low network signaling and power consumption.

In some cases, such as for both scenarios if a UE 115 is inside or outside a DRX active time when a base station transmits control signaling for the UE 115 to enter or exit the network energy saving BWP 310, a BWP switching DCI message may be received on a single cell of a set of configured serving cells (e.g., a reference cell which may be a PCell of a UE 115 or on a common cell for UEs 115 from different cells). In some cases, a UE 115 may transmit a feedback report (e.g., a HARQ-acknowledgment (ACK)) report to a network or base station to indicate whether the BWP switching DCI message is successfully decoded. In some cases, such as if the cell where the DCI message may be received is also switched to a network energy saving BWP 310, a UE 115 may transmit a feedback message to the network before the UE 115 switches to the network energy saving BWP 310. In some cases, a UE 115 may transmit a feedback message to the network after the UE 115 switches to the network energy saving BWP.

In some examples, a UE 115 may switch out of the network energy saving BWP 310 according to a trigger event. In such cases, a reference cell may be configured for UEs 115 to monitor for the DCI message to exit network power saving mode. For example, a cell index may be indicated by the network energy saving mode or the reference cell may be configured by radio resource control and a UE 115 may assume the cell when the network switches mode, or both. The DCI message for the UE 115 to exit the network energy saving BWP 310 may be the trigger event. In some other examples, a UE 115 may exit the network energy saving BWP after a timer expires, where the timer may be configured at the UE 115. The expiration of the timer may be the trigger event. In some cases, the UE 115 may start the timer upon switching to the network energy saving BPW 310, upon receiving control signaling indicating for the UE 115 to enter the network energy saving BWP 310, or the like. In some examples, the UE 115 may switch out of the network energy saving BWP 310 at an indicated time period, such as an indicated or configured slot, subframe, or frame, where the time period may be the trigger event.

Figure 4:
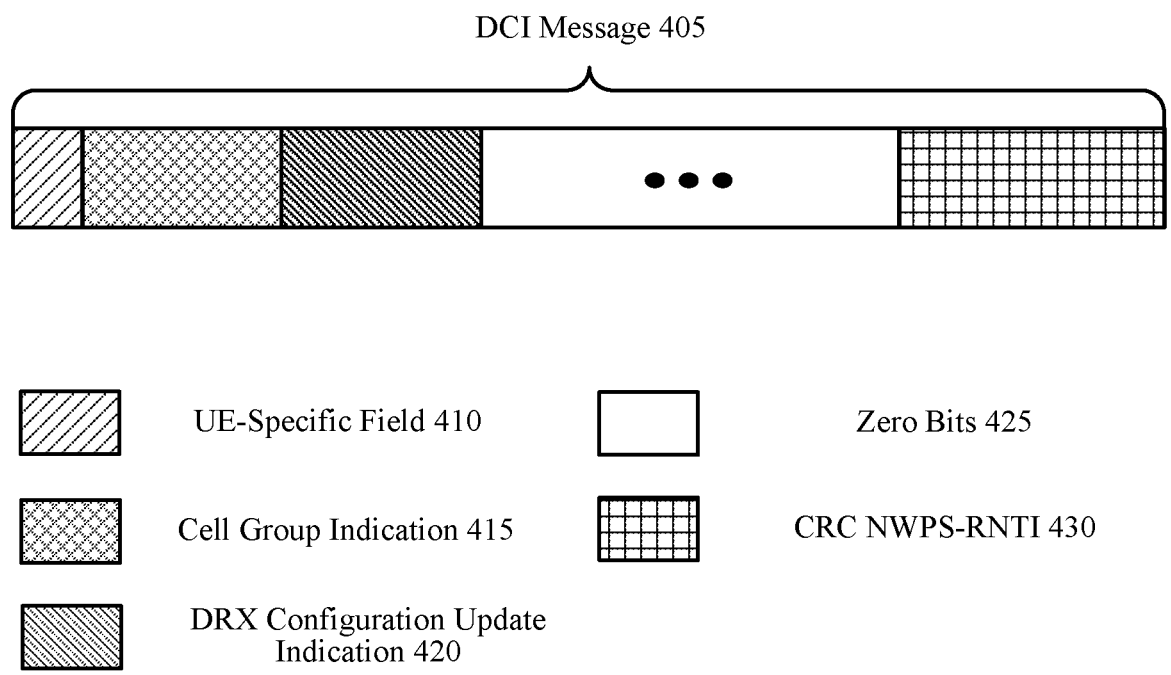
FIG. 4 illustrates an example of a resource diagram that supports BWP control for network power saving in accordance with aspects of the present disclosure.

FIG. 4 illustrates an example of a resource diagram 400 that supports BWP control for network power saving in accordance with aspects of the present disclosure. In some examples, resource diagram 400 may implement aspects of wireless communications system 100, wireless communications system 200, and wireless communications system 300. For example, a base station may transmit a DCI message 405 to multiple UEs, which may be examples of a base station 105 and UEs 115 as described with reference to FIGS. 1 through 3, such that the UEs may enter or exit a network energy saving BWP common across the UEs.

In some cases, a base station may communicate with multiple UEs, each UE operating according to a DRX cycle. If the DRX cycles of the UEs align, the base station may communicate control signaling and data with the multiple UEs concurrently, which may overload the base station (e.g., due to traffic load surpassing a threshold). In some cases, to achieve network power saving, multiple UEs in communication with a base station (e.g., a cell) may switch to a same BWP, which may be referred to as a network energy saving BWP. In some cases, a base station may transmit control signaling to one or more UEs to switch from a UE-specific BWP (e.g., an active BWP or a dormant BWP of each UE) to a network energy saving BWP. In some examples, a single BWP switching DCI may be used to switch UEs in communication with the base station into a same BWP both outside and inside a UE DRX cycle active time.

If a UE in communication with the base station is operating in a DRX inactive time (e.g., outside a DRX active time), the base station may send a single DCI message 405 to multiple UEs including the UE. For example, when a UE operates outside the DRX active time, a base station or network may define a new type of DCI message 405 to increase efficiency related to BWP switching into or out of a network energy saving BPW. In some cases, different DCI formats with a same size and control channel element (CCE) allocation may be decoded by a same blind detection at a UE. Thus, a base station may configure the new type of DCI message 405 that may not increase the number of blind detections to avoid or reduce an increase in power consumption at the UE. That is, the new type of DCI message 405 and another defined type of DCI message (e.g., DCI format 2_6 message) may be dynamically multiplexed in a same search space set occasion, a size of the new DCI message 405 may be aligned with the defined type of DCI message, the new DCI message 405 may be monitored in a same search space set as the synchronization signal set of the defined type of DCI message, or a combination thereof. Additionally or alternatively, a network or base station may define a new RNTI (e.g., network power saving (NWPS)-RNTI). In some cases, an aggregation level and a number of downlink control channel (e.g., PDCCH) candidates may be the same between the new DCI message 405 and defined DCI message. A monitoring window for the new DCI message 405 may be the same as or within a monitoring window for the defined DCI message.

In some cases, a number of UE-specific fields 410 in the new type of DCI message 405 may be relatively small, such as reduced when compared with a defined DCI message (e.g., smaller than a number of UE-specific fields 410 in a DCI format 2_6 message). The DCI format may be a cell specific DCI message 405 to achieve a cell level BWP switch, which may include each UE in communication with the cell (e.g., rather than a UE level BWP switch). In some examples, the DCI message 405 may include a single UE-specific field 410, such as a UE wakeup indication or other UE-specific field 410, which may be one bit in the DCI message 405. In some cases, a wakeup indication may be included in the DCI message 405 or in another DCI message, such as a DCI format 2_6 message. In some cases, when the other DCI message is configured at a network, if active serving cells are switched to a network energy saving mode, a UE may ignore a wakeup indication and may not wake up at an active time of a DRX cycle. In some examples, the DCI message 405 may include a cell-group indication 415, a DRX configuration update indication 420, or both. Additionally or alternatively, the other DCI message, such as a DCI format 2_6 message, may include the cell-group indication 415, the DRX configuration update indication 420, or both.

In some example, the cell group indication 415 included in the DCI message 405 may be different than that for a dormancy indication in another DCI message, such as a DCI format 2_6 message because a PCell may be involved in the network power saving operation. Since a number of UE-specific fields in the DCI message 405 is smaller than other DCI messages (e.g., 1), a finer cell group may be defined, such as each bit per cell. In some cases, a number of cell groups may be a threshold value (e.g., 5) for a dormancy indication outside a DRX active time. A number of cell groups for network power saving may be up to a threshold value (e.g., as large as the maximum number of configured serving cells, such as 16).

In some examples, the DCI message 405 may include a field to update a connected mode DRX configuration at one or more UEs to help further reduce network operation (e.g., increase the DRX cycle), such as a DRX configuration update indication 420. The field may indicate a time duration for UEs to sleep for an extended duration (e.g., DRX cycles to skip) after the UEs receives the DCI message 405 for network energy saving. If the serving cells are switched into energy saving mode, a UE may not wake up in an active time of a DRX cycle. In some cases, the DCI message 405 may include one or more zero bits 425, a cyclic redundancy check (CRC) NWPS-RNTI 430, or both.

Figure 5:
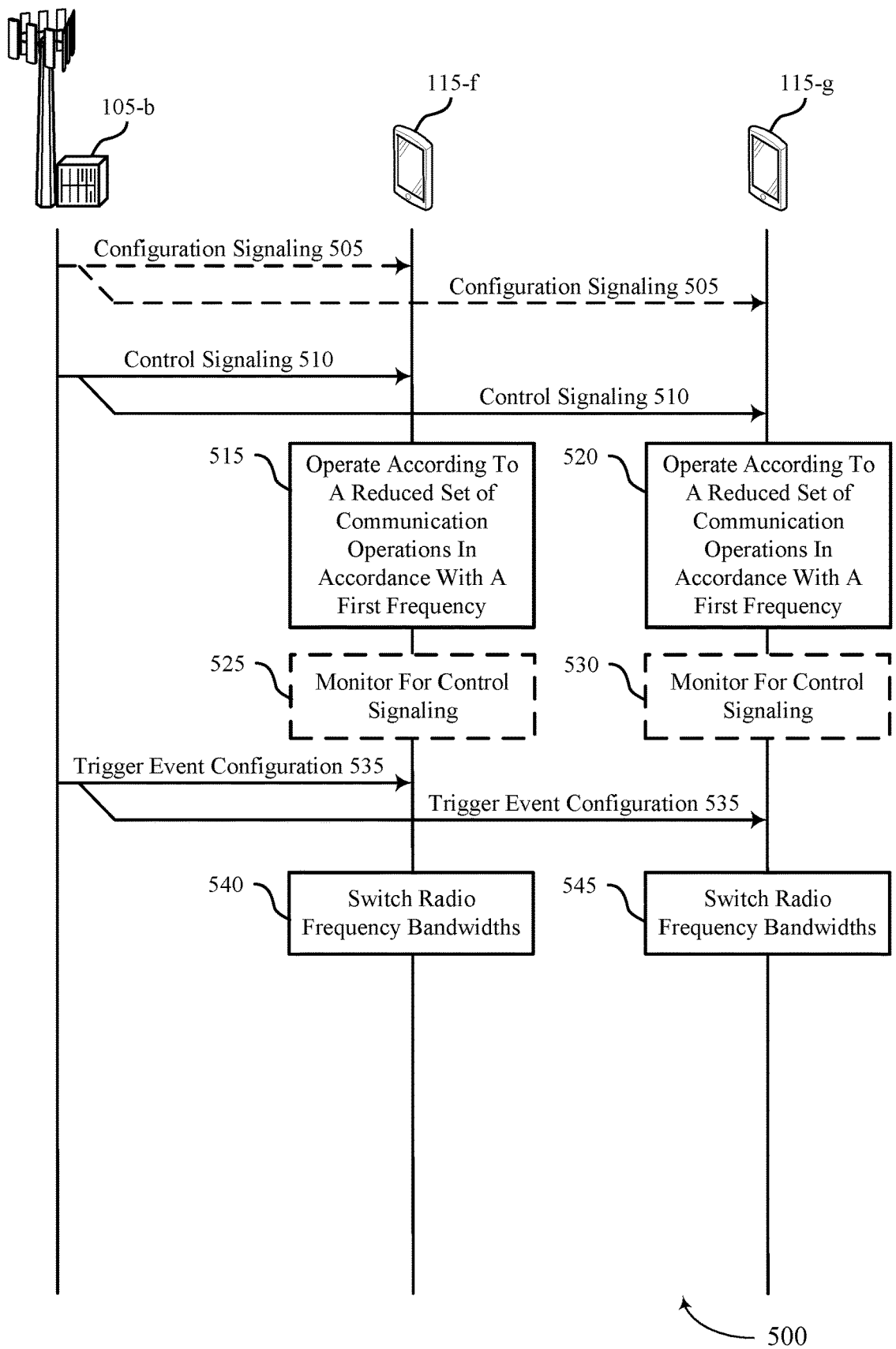
FIG. 5 illustrates an example of a process flow that supports BWP control for network power saving in accordance with aspects of the present disclosure.

FIG. 5 illustrates an example of a process flow 500 that supports BWP control for network power saving in accordance with aspects of the present disclosure. In some examples, process flow 500 may implement aspects of wireless communications system 100, wireless communications system 200, wireless communications system 300, and resource diagram 400. The process flow 500 may illustrate an example of a base station 105-*b* transmitting control signaling to multiple UEs 115 (e.g., UE 115-*f* and UE 115-*g*), which may be examples of a base station 105 and UEs 115 as described with reference to FIGS. 1 through 3, such that the UEs 115 may enter or exit a network energy saving BWP common across the UEs 115. Alternative examples of the following may be implemented, where some processes are performed in a different order than described or are not performed. In some cases, processes may include additional features not mentioned below, or further processes may be added.

At 505, UE 115-*f*, UE 115-*g*, or both may receive a reference cell configuration for monitoring for control signaling on a reference cell of multiple serving cells for UE 115-*f*, UE 115-*g*, or both.

At 510, base station 105-*b* may transmit control signaling, such as one or more DCI messages, indicating for multiple UEs 115 to use a radio frequency bandwidth, such as a network energy saving BWP, that may be configured for a reduced power usage level at base station 105-*b*. For example, base station 105-*b* may determine a traffic threshold at base station 105-*b* is surpassed, and may transmit the control signaling indicating the network energy saving BWP to UE 115-*f*, UE 115-*g*, or both. In some examples, base station 105-*b* may broadcast or groupcast the control signaling to UEs 115 within a coverage area of base station 105-*b*. In some examples, the UEs 115 may receive the signaling from a reference cell of multiple serving cells for each UE 115 (e.g., UE 115-*f*, UE 115-*g*, or both), the reference cell may include a PCell for each UE 115, a common cell for the UEs 115, or both. UE 115-*f*, UE 115-*g*, or both may receive the signaling based on the reference cell configuration received at 505.

In some examples, the control signaling may include a DCI message during an active time of a DRX at UE 115-*f*, UE 115-*g*, or both. The DCI message may include a group-based downlink control information message for the UEs 115 in a coverage area of base station 105-*b*, including UE 115-*f* and UE 115-*g*. In some cases, UE 115-*f*, UE 115-*g*, or both may monitor for the DCI message based on receiving another DCI message during an inactive time of the DRX cycle including an indication of the radio frequency bandwidth, receiving an indication of the reduced power usage level from base station 105-*b*, a configured monitoring periodicity, or a combination thereof.

In some other examples, the control signaling may include a new DCI message (e.g., of a new format) multiplexed with another DCI message in a same search space set occasion. UE 115-*f*, UE 115-*g*, or both may receive the new DCI message during an inactive time of a DRX cycle at the UEs 115. In some cases, at least one of the new DCI message, the other DCI message (e.g., a DCI format 2_6 message), or both may include the control signaling. The new format DCI message (e.g., first DCI message) may have an RNTI, such as a NWPS-RNTI, and the other DCI message may have a different RNTI. The new format DCI message may include a number of fields less than a number of fields of the other DCI message. The other DCI message may include one or more parameters of the new format DCI message. The new format DCI message may include a cell group indication with a single bit indicator per cell group, a field to update a configuration for a DRX cycle at the UEs 115 (e.g., a new inactive time with a duration longer than a current inactive time), or both.

At 515 and 520, UE 115-*f* and UE 115-*g*, respectively, may operate according to a reduced set of communication operations in accordance with the received radio frequency bandwidth and the reduced power usage level at base station 105-*b*. Base station 105-*b* may also operate according to a reduced set of communication operations. In some examples, UE 115-*f* and UE 115-*g* may refrain from monitoring an uplink shared channel (e.g., PUSCH), a downlink shared channel (e.g., PDSCH), an uplink control channel (e.g., PUCCH), a downlink control channel (e.g., PDCCH), one or more reference signals (e.g., CSI-RS), one or more SSBs, or a combination thereof. UE 115*f*, UE 115-*g*, or both may perform a RACH procedure with a reference cell of multiple serving cells for UE 115*f*, UE 115-*g*, or both.

At 525 and 530, UE 115-*f* and UE 115-*g*, respectively, may monitor the radio frequency bandwidth for control signaling from base station 105-*b*, the control signaling indicating for UE 115-*f*, UE 115-*g*, or both to switch from the radio frequency bandwidth to another radio frequency bandwidth.

In some cases, UE 115-*f*, UE 115-*g*, or both may transmit a feedback message to base station 105-*b* based on the received signaling and prior to operating according to the reduced set of communication operations. In some other cases, UE 115-*f*, UE 115-*g*, or both may transmit a feedback message to base station 105-*b* based on the received signaling and while operating according to the reduced set of communication operations.

At 535, base station 105-*b* may transmit an indication of a trigger event to UE 115*d*, UE 115-*g*, or both, the trigger event configured for switching the UEs 115 from the radio frequency bandwidth to at least another radio frequency bandwidth for communications with base station 105-*b*.

At 540 and 545, UE 115-*f* and UE 115-*g*, respectively, may switch from the radio frequency bandwidth to another radio frequency bandwidth for communications with base station 105-*b* based on a trigger event configured for switching a UE 115 out of the radio frequency bandwidth. In some cases, UE 115-*f*, UE 115-*g*, or both may determine a timer for the reduced power usage level at base station 105-*b* has expired, where a duration of the timer may be configured at the UE and the trigger event is the expiration of the timer. Additionally or alternatively, UE 115-*f*, UE 115-*g*, or both may receive an indication of a slot, subframe, frame, or a combination thereof in which to switch from the first radio frequency bandwidth to the second radio frequency bandwidth, wherein the trigger event is the slot, subframe, frame or the combination thereof. In some examples, UE 115-*f*, UE 115-*g*, or both may receive a configuration indicating the other radio frequency bandwidth. The other radio frequency bandwidth may be a same radio frequency bandwidth for communications with base station 105-*b* prior to receiving the control signaling at 510. The network energy saving bandwidth may be common to the UEs 115 (e.g., UE 115-*f* and UE 115-*g*), while the other radio frequency bandwidth may be specific to the UE. In some cases, the network energy saving radio frequency bandwidth may be narrower than the other radio frequency bandwidth.

Figure 6:
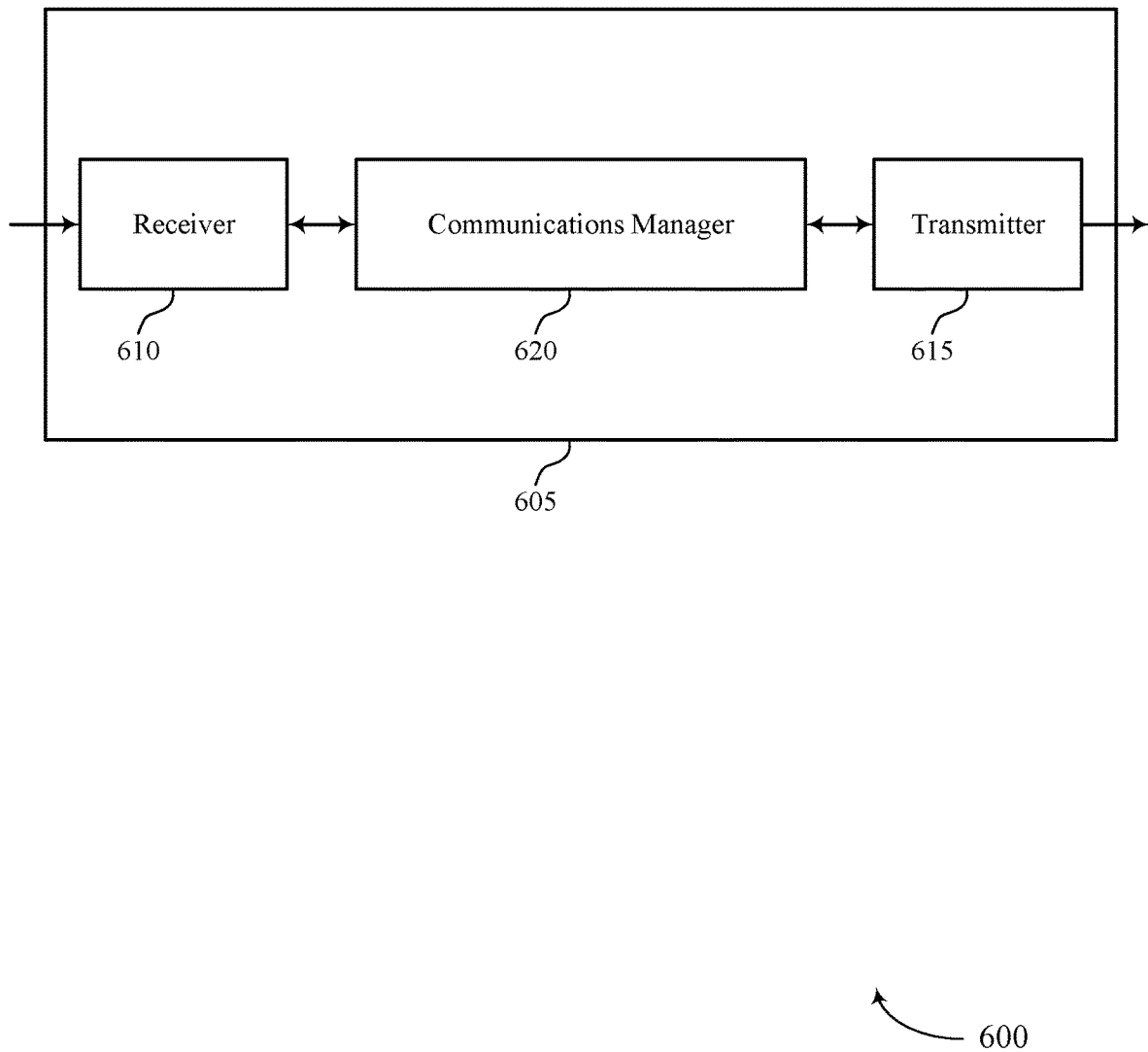
FIGS. 6 and 7 show block diagrams of devices that support BWP control for network power saving in accordance with aspects of the present disclosure.

FIG. 6 shows a block diagram 600 of a device 605 that supports BWP control for network power saving in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to BWP control for network power saving). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to BWP control for network power saving). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of BWP control for network power saving as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, signaling indicating for a set of multiple UEs including the UE to use a first radio frequency bandwidth that is configured for a reduced power usage level at the base station. The communications manager 620 may be configured as or otherwise support a means for operating according to a reduced set of communication operations in accordance with the first radio frequency bandwidth and the reduced power usage level at the base station. The communications manager 620 may be configured as or otherwise support a means for switching from the first radio frequency bandwidth to a second radio frequency bandwidth for communications with the base station based on a trigger event configured for switching the UE out of the first radio frequency bandwidth.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a base station to transmit control signaling to multiple UEs, such that the UEs may enter or exit a network energy saving BWP common across the UEs, which may cause reduced processing, reduced power consumption, more efficient utilization of communication resources, or the like.

Figure 7:
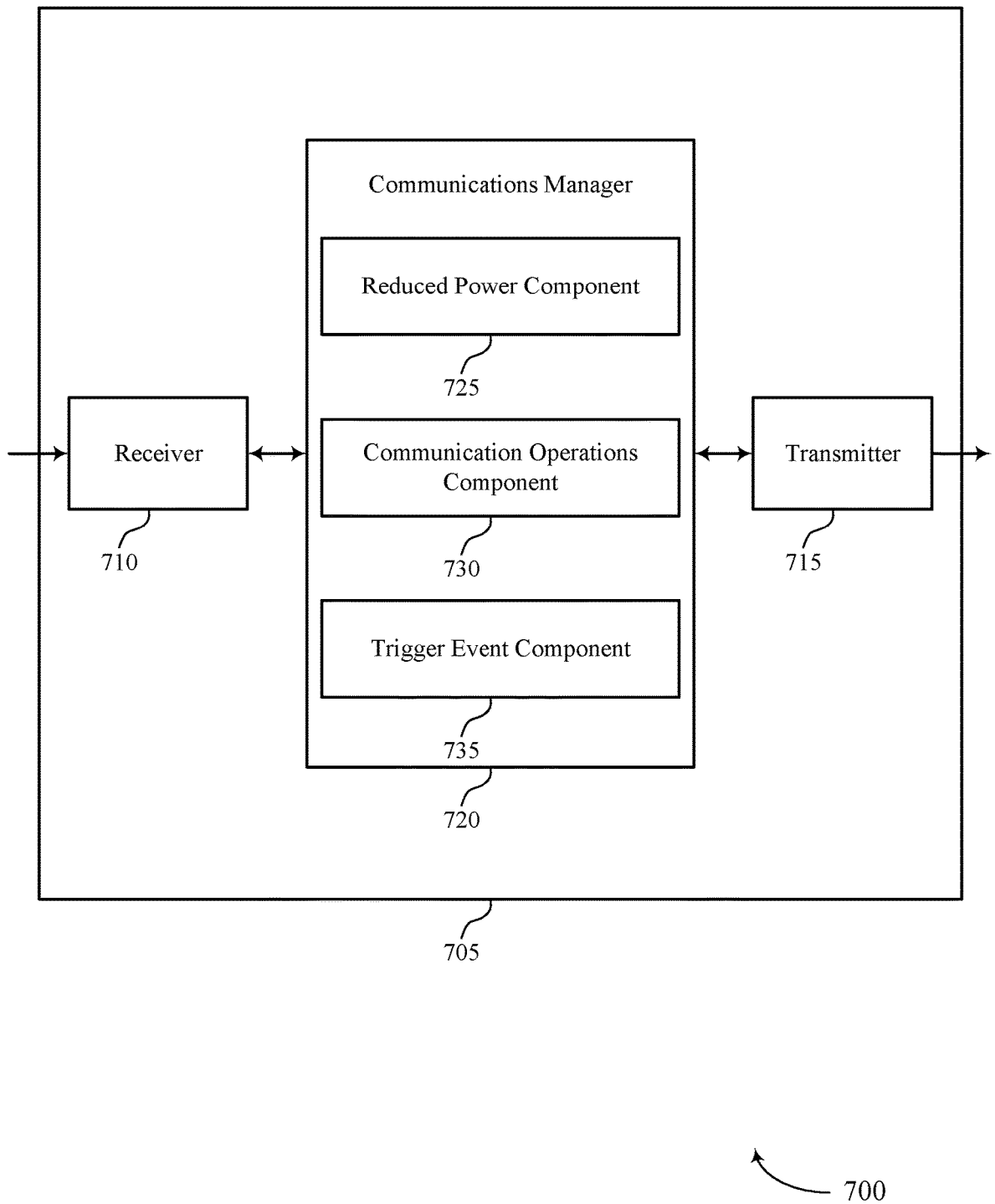

FIG. 7 shows a block diagram 700 of a device 705 that supports BWP control for network power saving in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to BWP control for network power saving). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to BWP control for network power saving). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of BWP control for network power saving as described herein. For example, the communications manager 720 may include a reduced power component 725, a communication operations component 730, a trigger event component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The reduced power component 725 may be configured as or otherwise support a means for receiving, from a base station, signaling indicating for a set of multiple UEs including the UE to use a first radio frequency bandwidth that is configured for a reduced power usage level at the base station. The communication operations component 730 may be configured as or otherwise support a means for operating according to a reduced set of communication operations in accordance with the first radio frequency bandwidth and the reduced power usage level at the base station. The trigger event component 735 may be configured as or otherwise support a means for switching from the first radio frequency bandwidth to a second radio frequency bandwidth for communications with the base station based on a trigger event configured for switching the UE out of the first radio frequency bandwidth.

Figure 8:
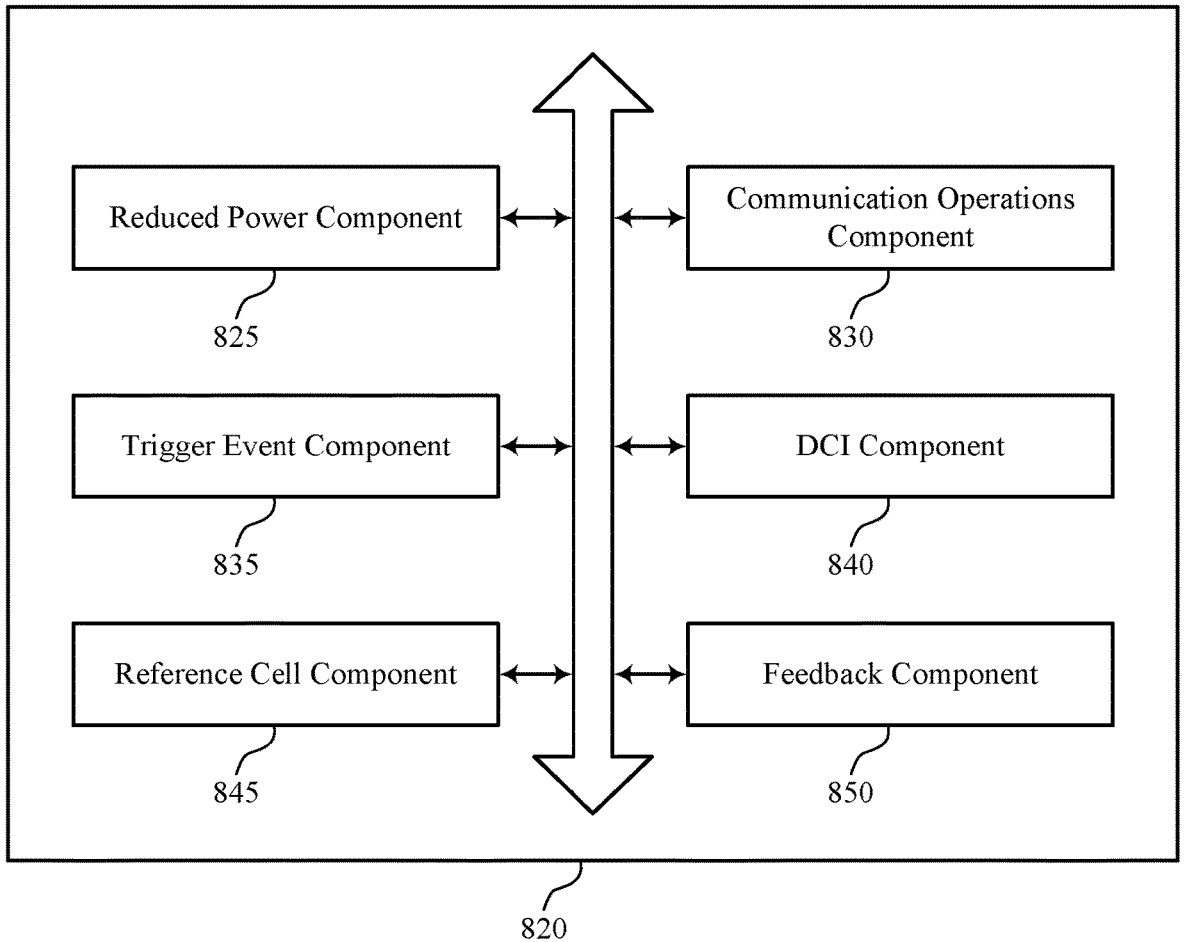
FIG. 8 shows a block diagram of a communications manager that supports BWP control for network power saving in accordance with aspects of the present disclosure.

FIG. 8 shows a block diagram 800 of a communications manager 820 that supports BWP control for network power saving in accordance with aspects of the present disclosure. The communications manager 820 may be an example of aspects of a communications manager 620, a communications manager 720, or both, as described herein. The communications manager 820, or various components thereof, may be an example of means for performing various aspects of BWP control for network power saving as described herein. For example, the communications manager 820 may include a reduced power component 825, a communication operations component 830, a trigger event component 835, a DCI component 840, a reference cell component 845, a feedback component 850, or any combination thereof. Each of these components may communicate, directly or indirectly, with one another (e.g., via one or more buses).

The communications manager 820 may support wireless communication at a UE in accordance with examples as disclosed herein. The reduced power component 825 may be configured as or otherwise support a means for receiving, from a base station, signaling indicating for a set of multiple UEs including the UE to use a first radio frequency bandwidth that is configured for a reduced power usage level at the base station. The communication operations component 830 may be configured as or otherwise support a means for operating according to a reduced set of communication operations in accordance with the first radio frequency bandwidth and the reduced power usage level at the base station. The trigger event component 835 may be configured as or otherwise support a means for switching from the first radio frequency bandwidth to a second radio frequency bandwidth for communications with the base station based on a trigger event configured for switching the UE out of the first radio frequency bandwidth.

In some examples, to support receiving the signaling, the DCI component 840 may be configured as or otherwise support a means for receiving a first DCI message including the signaling during an active time of a discontinuous reception cycle at the UE, where the first DCI message includes a group-based DCI message corresponding to the set of multiple UEs.

In some examples, the DCI component 840 may be configured as or otherwise support a means for monitoring for the first DCI message based on receiving a second DCI message during an inactive time of the discontinuous reception cycle including an indication of the first radio frequency bandwidth, receiving an indication of the reduced power usage level from the base station, a configured monitoring periodicity, or a combination thereof.

In some examples, to support receiving the signaling, the DCI component 840 may be configured as or otherwise support a means for receiving, during an inactive time of a discontinuous reception cycle at the UE, a first DCI message, where the first DCI message is multiplexed with a second DCI message in a same search space set occasion, at least one of the first DCI message, the second DCI message, or both including the signaling.

In some examples, the first DCI message corresponds to a first radio network temporary identifier and the second DCI message corresponds to a second radio network temporary identifier different from the first radio network temporary identifier.

In some examples, the first DCI message includes a first number of fields and the second DCI message includes a second number of fields. In some examples, the first number of fields is less than the second number of fields.

In some examples, the second DCI message includes one or more parameters of the first DCI message.

In some examples, the first DCI message includes a cell group indication including a single bit indicator per cell group.

In some examples, the first DCI message includes a field to update a configuration corresponding to the discontinuous reception cycle. In some examples, the field includes a new inactive time with a duration longer than the inactive time.

In some examples, the reference cell component 845 may be configured as or otherwise support a means for receiving, on a reference cell of a set of multiple serving cells for the UE, a reference cell configuration for monitoring for the signaling, where receiving the signaling is based on the reference cell configuration.

In some examples, to support switching from the first radio frequency bandwidth to the second radio frequency bandwidth, the trigger event component 835 may be configured as or otherwise support a means for determining a timer corresponding to the reduced power usage level at the base station has expired, where. In some examples, to support switching from the first radio frequency bandwidth to the second radio frequency bandwidth, the trigger event component 835 may be configured as or otherwise support a means for a duration of the timer is configured at the UE. In some examples, to support switching from the first radio frequency bandwidth to the second radio frequency bandwidth, the trigger event component 835 may be configured as or otherwise support a means for the trigger event includes expiration of the timer.

In some examples, to support switching from the first radio frequency bandwidth to the second radio frequency bandwidth, the trigger event component 835 may be configured as or otherwise support a means for receiving an indication of a slot, subframe, frame, or a combination thereof in which to switch from the first radio frequency bandwidth to the second radio frequency bandwidth, where the trigger event is the slot, subframe, frame or the combination thereof.

In some examples, the feedback component 850 may be configured as or otherwise support a means for transmitting, to the base station and prior to operating according to the reduced set of communication operations, a feedback message based on the received signaling.

In some examples, the feedback component 850 may be configured as or otherwise support a means for transmitting, to the base station and while operating according to the reduced set of communication operations, a feedback message based on the received signaling.

In some examples, the reference cell component 845 may be configured as or otherwise support a means for receiving the signaling from a reference cell of a set of multiple serving cells for the UE, the reference cell including a primary cell for the UE, a common cell for the set of multiple UEs, or both.

In some examples, to support operating according to the reduced set of communication operations, the communication operations component 830 may be configured as or otherwise support a means for refraining from monitoring an uplink shared channel, a downlink shared channel, an uplink control channel, a downlink control channel, one or more reference signals, one or more synchronization signal blocks, or a combination thereof.

In some examples, to support operating according to the reduced set of communication operations, the communication operations component 830 may be configured as or otherwise support a means for monitoring the first radio frequency bandwidth for control signaling from the base station, the control signaling indicating for the UE to switch from the first radio frequency bandwidth to the second radio frequency bandwidth.

In some examples, to support operating according to the reduced set of communication operations, the communication operations component 830 may be configured as or otherwise support a means for performing a random access channel procedure with a reference cell of a set of multiple serving cells for the UE.

In some examples, the reduced power component 825 may be configured as or otherwise support a means for receiving a configuration indicating the second radio frequency bandwidth.

In some examples, the second radio frequency bandwidth is a same radio frequency bandwidth for communications with the base station prior to receiving the signaling.

In some examples, the first radio frequency bandwidth is common to the set of multiple UEs. In some examples, the second radio frequency bandwidth is specific to the UE.

In some examples, the first radio frequency bandwidth is narrower than the second radio frequency bandwidth.

Figure 9:
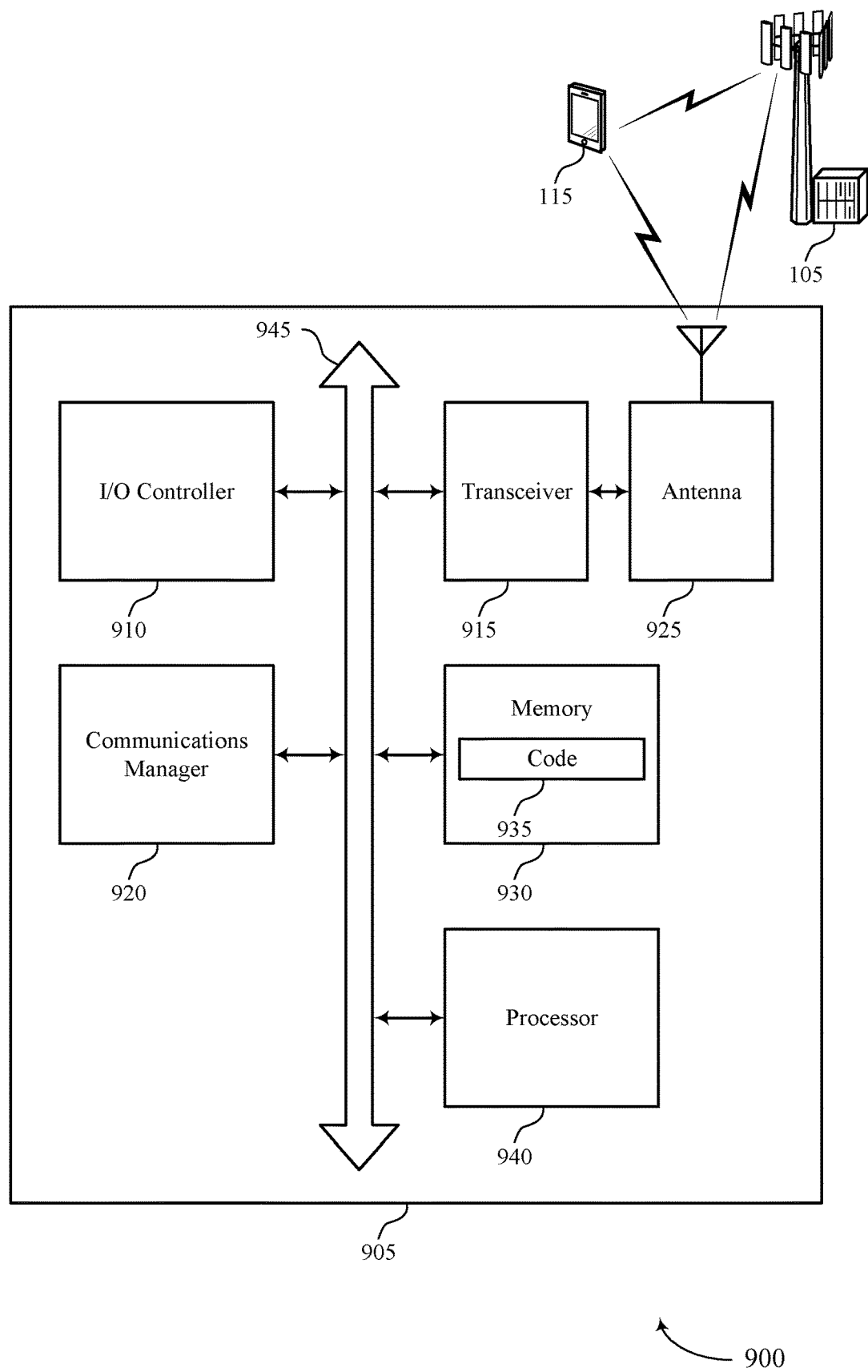
FIG. 9 shows a diagram of a system including a device that supports BWP control for network power saving in accordance with aspects of the present disclosure.

FIG. 9 shows a diagram of a system 900 including a device 905 that supports BWP control for network power saving in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting BWP control for network power saving). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, signaling indicating for a set of multiple UEs including the UE to use a first radio frequency bandwidth that is configured for a reduced power usage level at the base station. The communications manager 920 may be configured as or otherwise support a means for operating according to a reduced set of communication operations in accordance with the first radio frequency bandwidth and the reduced power usage level at the base station. The communications manager 920 may be configured as or otherwise support a means for switching from the first radio frequency bandwidth to a second radio frequency bandwidth for communications with the base station based on a trigger event configured for switching the UE out of the first radio frequency bandwidth.

By including or configuring the communications manager 920 in accordance with examples as described herein, the device 905 may support techniques for a base station to transmit control signaling to multiple UEs, such that the UEs may enter or exit a network energy saving BWP common across the UEs, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of BWP control for network power saving as described herein, or the processor 940 and the memory 930 may be otherwise configured to perform or support such operations.

Figure 10:
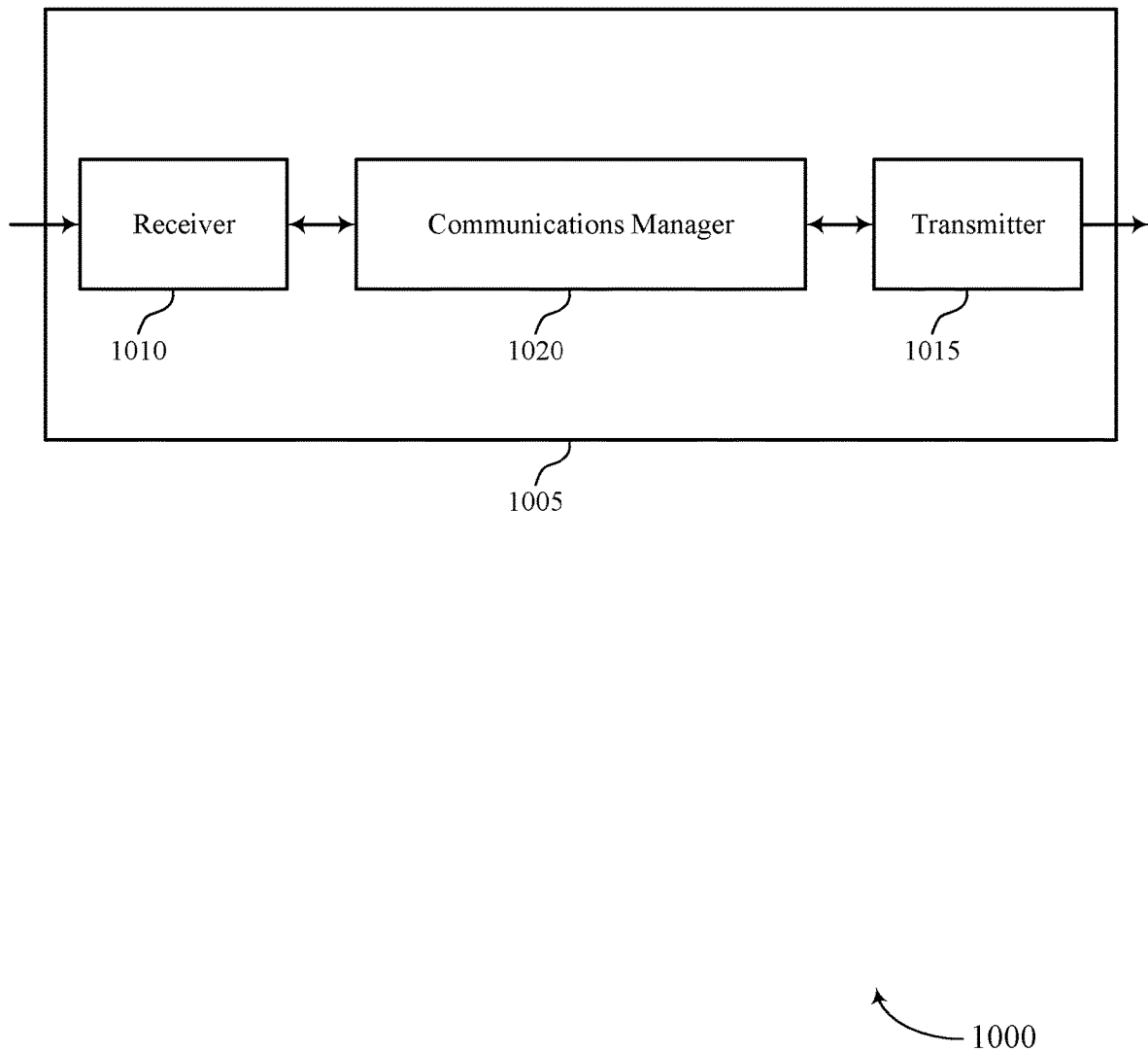
FIGS. 10 and 11 show block diagrams of devices that support BWP control for network power saving in accordance with aspects of the present disclosure.

FIG. 10 shows a block diagram 1000 of a device 1005 that supports BWP control for network power saving in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to BWP control for network power saving). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to BWP control for network power saving). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of BWP control for network power saving as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a set of multiple user equipments (UEs), first signaling indicating for the set of multiple UEs to use a first radio frequency bandwidth that is configured for a reduced power usage level at the base station. The communications manager 1020 may be configured as or otherwise support a means for operating according to a reduced set of communication operations in accordance with the first radio frequency bandwidth and the reduced power usage level at the base station. The communications manager 1020 may be configured as or otherwise support a means for transmitting, to the set of multiple UEs, an indication of a trigger event configured for switching the set of multiple UEs from the first radio frequency bandwidth to at least a second radio frequency bandwidth for communications with the base station.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a base station to transmit control signaling to multiple UEs, such that the UEs may enter or exit a network energy saving BWP common across the UEs, which may cause reduced processing, reduced power consumption, more efficient utilization of communication resources, or the like.

Figure 11:
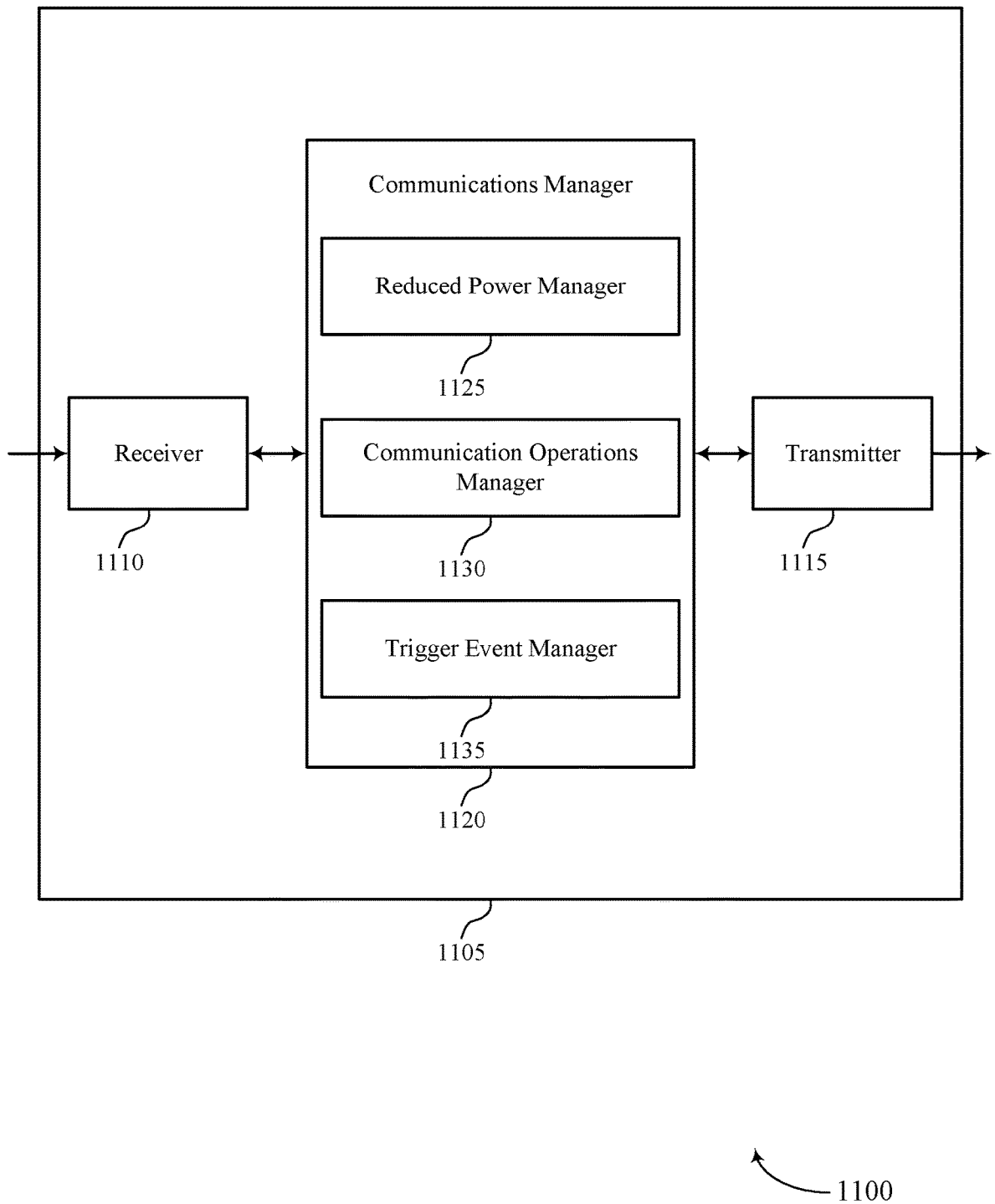

FIG. 11 shows a block diagram 1100 of a device 1105 that supports BWP control for network power saving in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to BWP control for network power saving). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to BWP control for network power saving). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of BWP control for network power saving as described herein. For example, the communications manager 1120 may include a reduced power manager 1125, a communication operations manager 1130, a trigger event manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The reduced power manager 1125 may be configured as or otherwise support a means for transmitting, to a set of multiple user equipments (UEs), first signaling indicating for the set of multiple UEs to use a first radio frequency bandwidth that is configured for a reduced power usage level at the base station. The communication operations manager 1130 may be configured as or otherwise support a means for operating according to a reduced set of communication operations in accordance with the first radio frequency bandwidth and the reduced power usage level at the base station. The trigger event manager 1135 may be configured as or otherwise support a means for transmitting, to the set of multiple UEs, an indication of a trigger event configured for switching the set of multiple UEs from the first radio frequency bandwidth to at least a second radio frequency bandwidth for communications with the base station.

Figure 12:
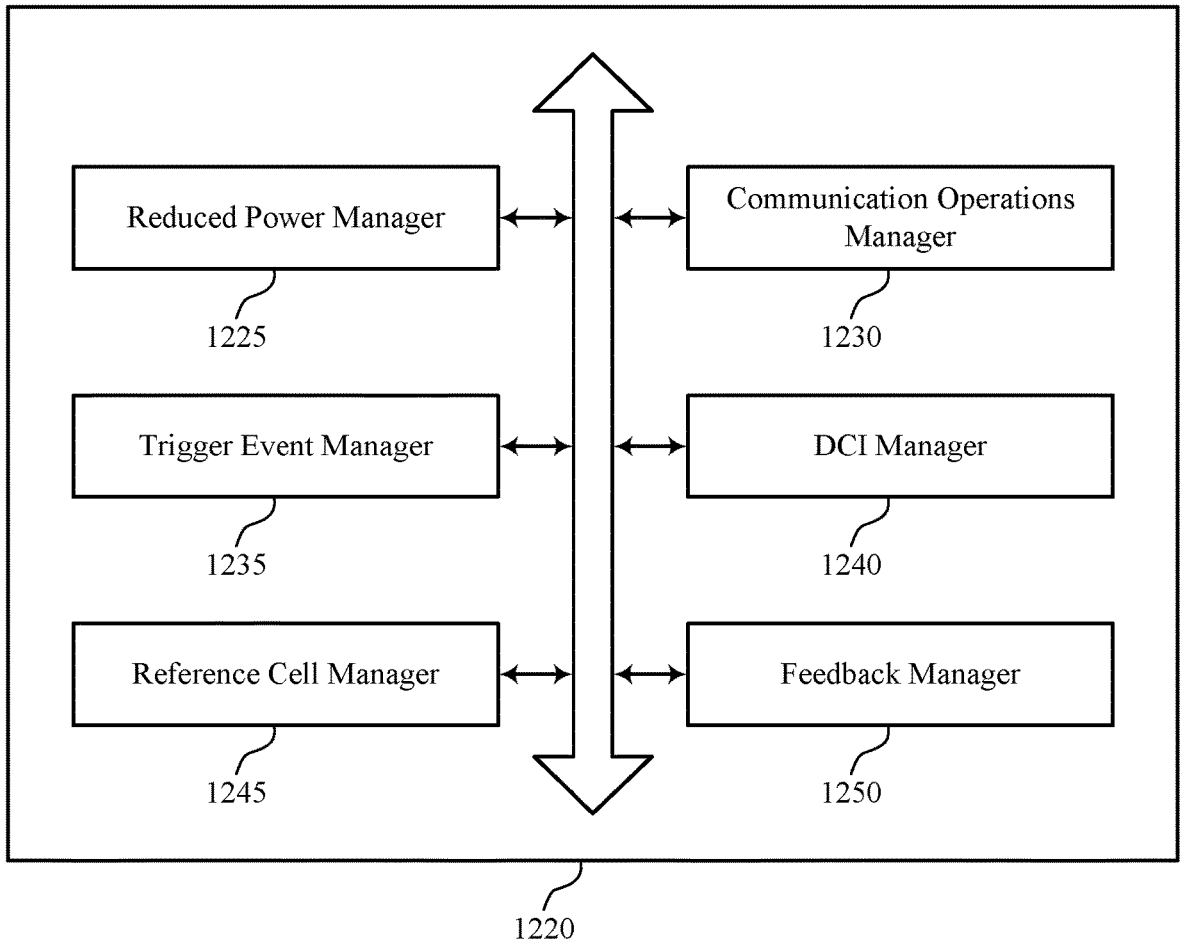
FIG. 12 shows a block diagram of a communications manager that supports BWP control for network power saving in accordance with aspects of the present disclosure.

FIG. 12 shows a block diagram 1200 of a communications manager 1220 that supports BWP control for network power saving in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of BWP control for network power saving as described herein. For example, the communications manager 1220 may include a reduced power manager 1225, a communication operations manager 1230, a trigger event manager 1235, a DCI manager 1240, a reference cell manager 1245, a feedback manager 1250, or any combination thereof. Each of these components may communicate, directly or indirectly, with one another (e.g., via one or more buses).

The communications manager 1220 may support wireless communication at a base station in accordance with examples as disclosed herein. The reduced power manager 1225 may be configured as or otherwise support a means for transmitting, to a set of multiple user equipments (UEs), first signaling indicating for the set of multiple UEs to use a first radio frequency bandwidth that is configured for a reduced power usage level at the base station. The communication operations manager 1230 may be configured as or otherwise support a means for operating according to a reduced set of communication operations in accordance with the first radio frequency bandwidth and the reduced power usage level at the base station. The trigger event manager 1235 may be configured as or otherwise support a means for transmitting, to the set of multiple UEs, an indication of a trigger event configured for switching the set of multiple UEs from the first radio frequency bandwidth to at least a second radio frequency bandwidth for communications with the base station.

In some examples, to support transmitting the first signaling, the DCI manager 1240 may be configured as or otherwise support a means for transmitting a first DCI message including the first signaling during an active time of a discontinuous reception cycle at the UE, where the first DCI message includes a group-based DCI message corresponding to the set of multiple UEs.

In some examples, the DCI manager 1240 may be configured as or otherwise support a means for transmitting, to the set of multiple UEs, a second DCI message during an inactive time of the discontinuous reception cycle including an indication of the first radio frequency bandwidth, an indication of the reduced power usage level, a monitoring precocity configuration, or a combination thereof.

In some examples, to support transmitting the first signaling, the DCI manager 1240 may be configured as or otherwise support a means for transmitting, during an inactive time of a discontinuous reception cycle at the UE, a first DCI message, where the first DCI message is multiplexed with a second DCI message in a same search space set occasion, at least one of the first DCI message, the second DCI message, or both including the first signaling.

In some examples, the first DCI message corresponds to a first radio network temporary identifier and the second DCI message corresponds to a second radio network temporary identifier different from the first radio network temporary identifier.

In some examples, the first DCI message includes a first number of fields and the second DCI message includes a second number of fields. In some examples, the first number of fields is less than the second number of fields.

In some examples, the second DCI message includes one or more parameters of the first DCI message.

In some examples, the first DCI message includes a cell group indication including a single bit indicator per cell group.

In some examples, the first DCI message includes a field to update a configuration corresponding to the discontinuous reception cycle. In some examples, the field includes a new inactive time with a duration longer than the inactive time.

In some examples, the reference cell manager 1245 may be configured as or otherwise support a means for transmitting, on a reference cell of a set of multiple serving cells for the UE, a reference cell configuration for the first signaling, where transmitting the first signaling is based on the reference cell configuration.

In some examples, the trigger event manager 1235 may be configured as or otherwise support a means for transmitting, to the UE, a timer configuration for switching from the first radio frequency bandwidth to the second radio frequency bandwidth, where the trigger event includes expiration of a timer associated with the timer configuration.

In some examples, to support transmitting the indication of the trigger event, the trigger event manager 1235 may be configured as or otherwise support a means for transmitting an indication of a slot, subframe, frame, or a combination thereof in which to switch from the first radio frequency bandwidth to the second radio frequency bandwidth, where the trigger event is the slot, subframe, frame or the combination thereof.

In some examples, the feedback manager 1250 may be configured as or otherwise support a means for receiving, from at least one UE of the set of multiple UEs and prior to operating according to the reduced set of communication operations, a feedback message based on transmitting the first signaling.

In some examples, the feedback manager 1250 may be configured as or otherwise support a means for receiving, from at least one UE of the set of multiple UEs and while operating according to the reduced set of communication operations, a feedback message based on transmitting the first signaling.

In some examples, the reference cell manager 1245 may be configured as or otherwise support a means for transmitting the first signaling from a reference cell of a set of multiple serving cells for the UE, the reference cell including a primary cell for the UE, a common cell for the set of multiple UEs, or both.

In some examples, to support operating according to the reduced set of communication operations, the communication operations manager 1230 may be configured as or otherwise support a means for refraining from transmitting second signaling including an uplink shared channel, a downlink shared channel, an uplink control channel, a downlink control channel, one or more reference signals, one or more synchronization signal blocks, or a combination thereof.

In some examples, to support operating according to the reduced set of communication operations, the communication operations manager 1230 may be configured as or otherwise support a means for transmitting, to at least one UE of the set of multiple UEs, second signaling according to the first radio frequency bandwidth, the second signaling indicating for the UE to switch from the first radio frequency bandwidth to the second radio frequency bandwidth.

In some examples, to support operating according to the reduced set of communication operations, the communication operations manager 1230 may be configured as or otherwise support a means for performing a random access channel procedure with a reference cell of a set of multiple serving cells for the UE.

In some examples, the reduced power manager 1225 may be configured as or otherwise support a means for transmitting a configuration indicating the second radio frequency bandwidth.

In some examples, the second radio frequency bandwidth is a same radio frequency bandwidth for communications with the UE prior to transmitting the first signaling.

In some examples, the first radio frequency bandwidth is common to the set of multiple UEs. In some examples, the second radio frequency bandwidth is specific to a UE of the set of multiple UEs.

In some examples, the first radio frequency bandwidth is narrower than the second radio frequency bandwidth.

Figure 13:
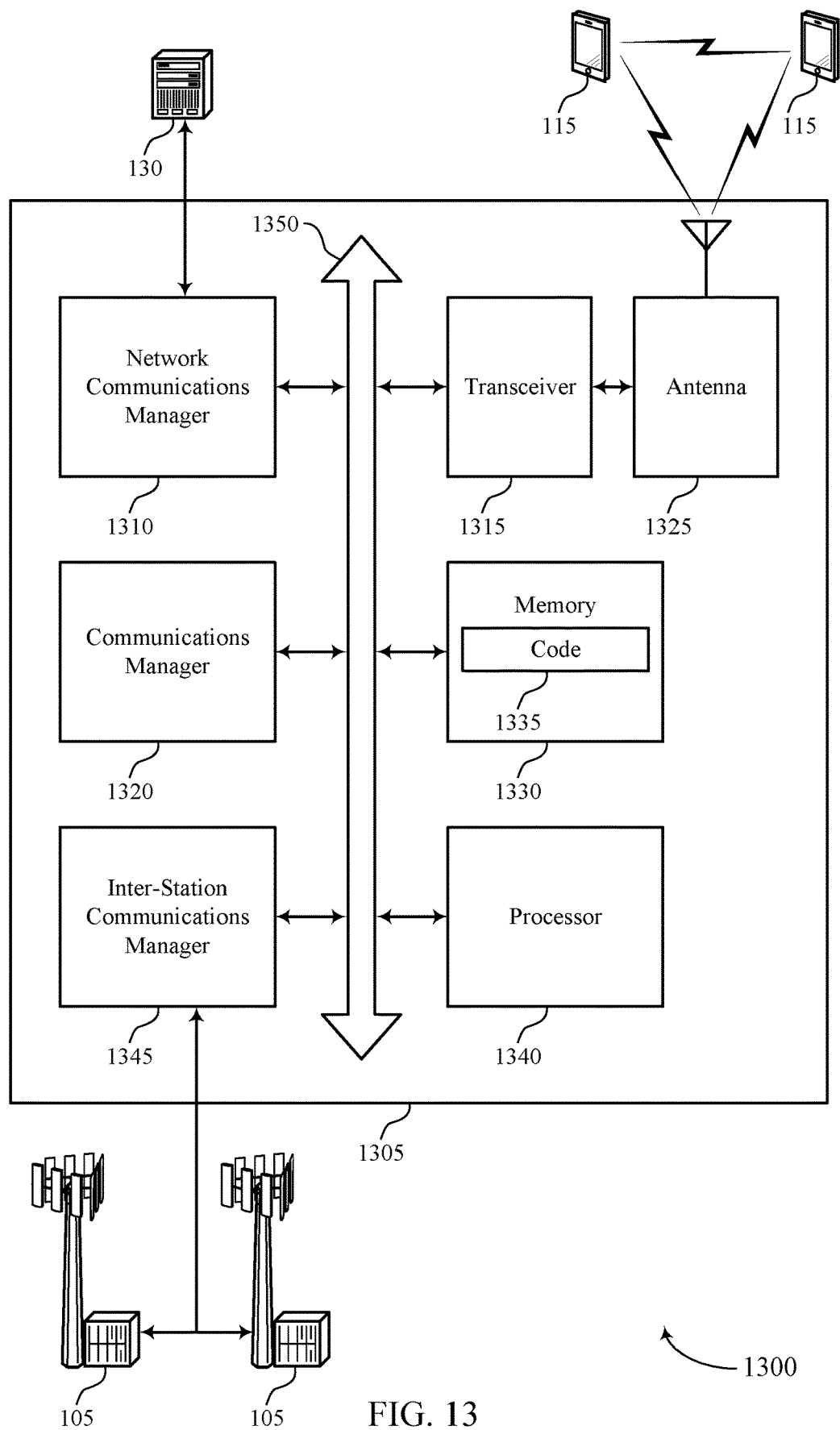
FIG. 13 shows a diagram of a system including a device that supports BWP control for network power saving in accordance with aspects of the present disclosure.

FIG. 13 shows a diagram of a system 1300 including a device 1305 that supports BWP control for network power saving in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting BWP control for network power saving). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a set of multiple user equipments (UEs), first signaling indicating for the set of multiple UEs to use a first radio frequency bandwidth that is configured for a reduced power usage level at the base station. The communications manager 1320 may be configured as or otherwise support a means for operating according to a reduced set of communication operations in accordance with the first radio frequency bandwidth and the reduced power usage level at the base station. The communications manager 1320 may be configured as or otherwise support a means for transmitting, to the set of multiple UEs, an indication of a trigger event configured for switching the set of multiple UEs from the first radio frequency bandwidth to at least a second radio frequency bandwidth for communications with the base station.

By including or configuring the communications manager 1320 in accordance with examples as described herein, the device 1305 may support techniques for a base station to transmit control signaling to multiple UEs, such that the UEs may enter or exit a network energy saving BWP common across the UEs, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of BWP control for network power saving as described herein, or the processor 1340 and the memory 1330 may be otherwise configured to perform or support such operations.

Figure 14:
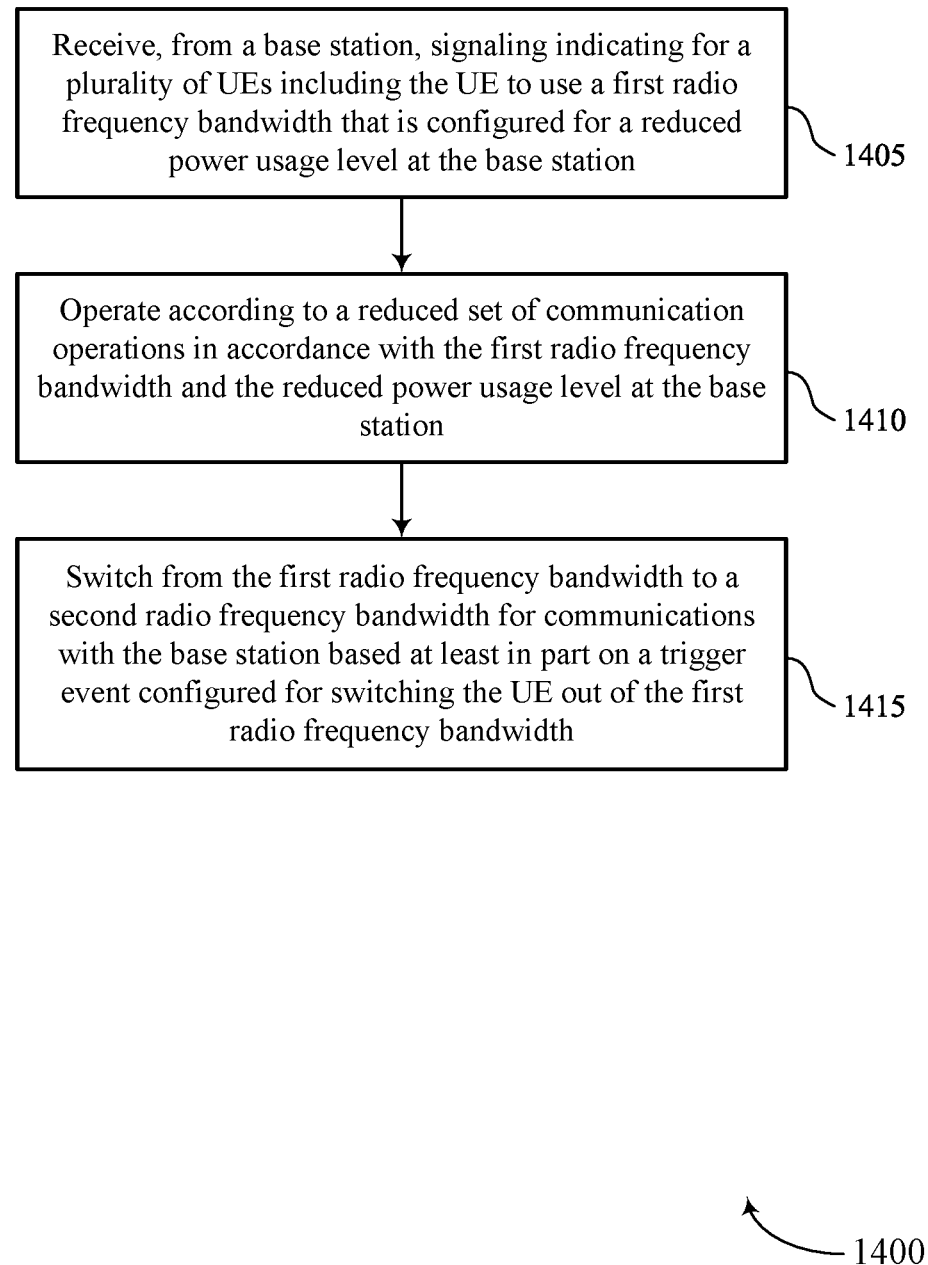
FIGS. 14 through 17 show flowcharts illustrating methods that support BWP control for network power saving in accordance with aspects of the present disclosure.

FIG. 14 shows a flowchart illustrating a method 1400 that supports BWP control for network power saving in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, signaling indicating for a set of multiple UEs including the UE to use a first radio frequency bandwidth that is configured for a reduced power usage level at the base station. The operations of 1405 may be performed in accordance with examples as disclosed herein. In some examples, aspects of the operations of 1405 may be performed by a reduced power component 825 as described with reference to FIG. 8.

At 1410, the method may include operating according to a reduced set of communication operations in accordance with the first radio frequency bandwidth and the reduced power usage level at the base station. The operations of 1410 may be performed in accordance with examples as disclosed herein. In some examples, aspects of the operations of 1410 may be performed by a communication operations component 830 as described with reference to FIG. 8.

At 1415, the method may include switching from the first radio frequency bandwidth to a second radio frequency bandwidth for communications with the base station based on a trigger event configured for switching the UE out of the first radio frequency bandwidth. The operations of 1415 may be performed in accordance with examples as disclosed herein. In some examples, aspects of the operations of 1415 may be performed by a trigger event component 835 as described with reference to FIG. 8.

Figure 15:
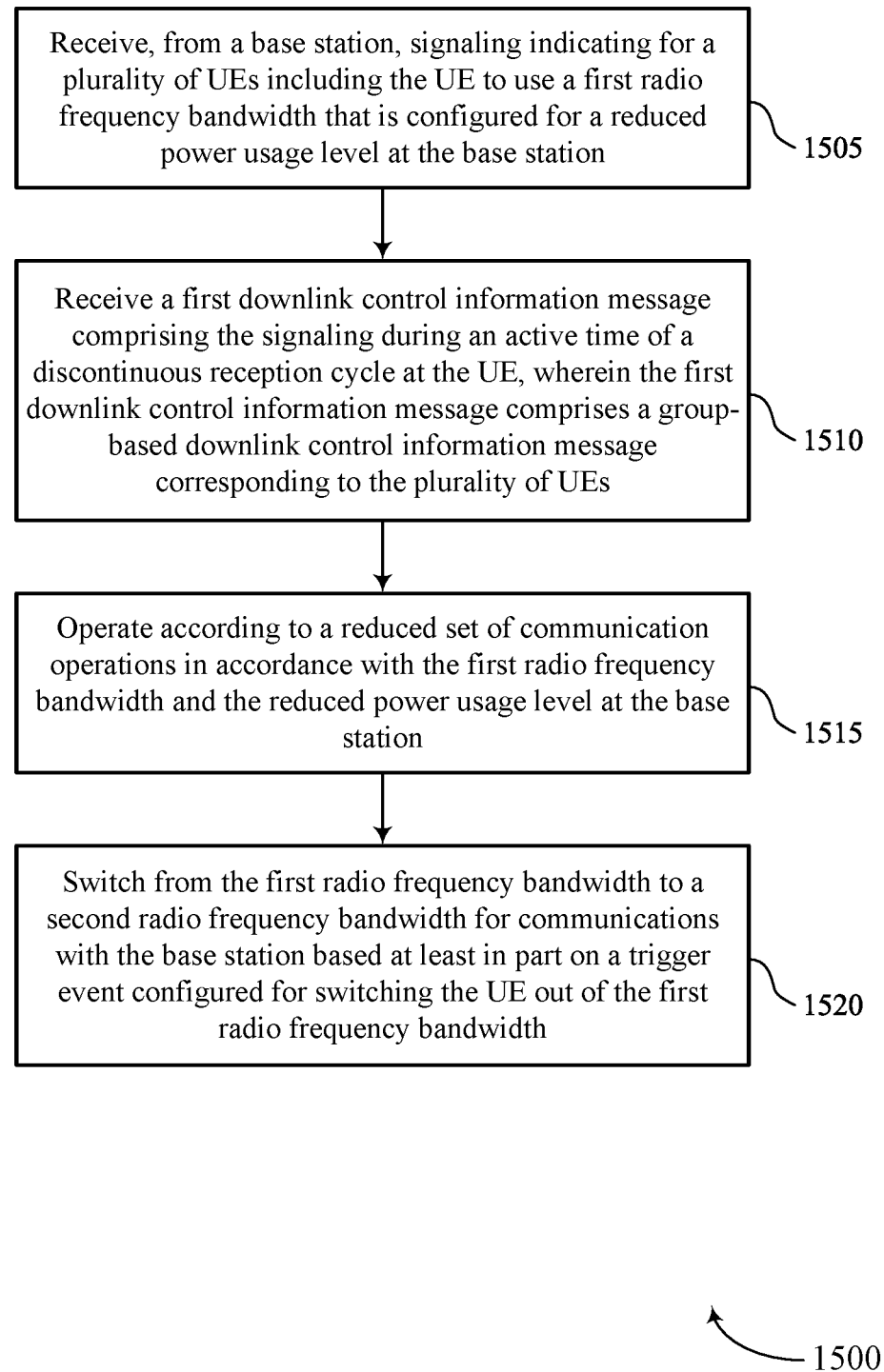

FIG. 15 shows a flowchart illustrating a method 1500 that supports BWP control for network power saving in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, signaling indicating for a set of multiple UEs including the UE to use a first radio frequency bandwidth that is configured for a reduced power usage level at the base station. The operations of 1505 may be performed in accordance with examples as disclosed herein. In some examples, aspects of the operations of 1505 may be performed by a reduced power component 825 as described with reference to FIG. 8.

At 1510, the method may include receiving a first DCI message including the signaling during an active time of a discontinuous reception cycle at the UE, where the first DCI message includes a group-based DCI message corresponding to the set of multiple UEs. The operations of 1510 may be performed in accordance with examples as disclosed herein. In some examples, aspects of the operations of 1510 may be performed by a DCI component 840 as described with reference to FIG. 8.

At 1515, the method may include operating according to a reduced set of communication operations in accordance with the first radio frequency bandwidth and the reduced power usage level at the base station. The operations of 1515 may be performed in accordance with examples as disclosed herein. In some examples, aspects of the operations of 1515 may be performed by a communication operations component 830 as described with reference to FIG. 8.

At 1520, the method may include switching from the first radio frequency bandwidth to a second radio frequency bandwidth for communications with the base station based on a trigger event configured for switching the UE out of the first radio frequency bandwidth. The operations of 1520 may be performed in accordance with examples as disclosed herein. In some examples, aspects of the operations of 1520 may be performed by a trigger event component 835 as described with reference to FIG. 8.

Figure 16:
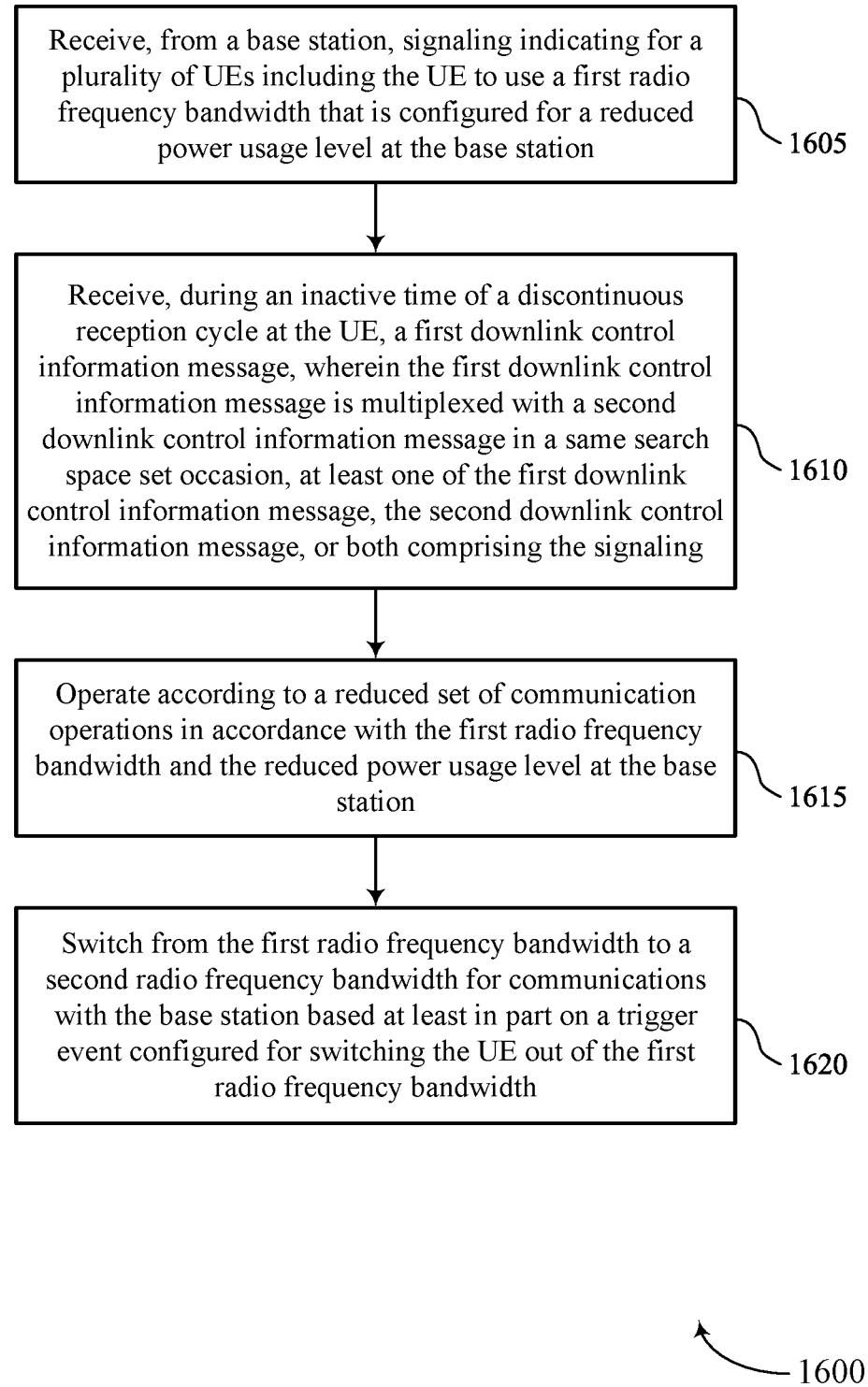

FIG. 16 shows a flowchart illustrating a method 1600 that supports BWP control for network power saving in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, signaling indicating for a set of multiple UEs including the UE to use a first radio frequency bandwidth that is configured for a reduced power usage level at the base station. The operations of 1605 may be performed in accordance with examples as disclosed herein. In some examples, aspects of the operations of 1605 may be performed by a reduced power component 825 as described with reference to FIG. 8.

At 1610, the method may include receiving, during an inactive time of a discontinuous reception cycle at the UE, a first DCI message, where the first DCI message is multiplexed with a second DCI message in a same search space set occasion, at least one of the first DCI message, the second DCI message, or both including the signaling. The operations of 1610 may be performed in accordance with examples as disclosed herein. In some examples, aspects of the operations of 1610 may be performed by a DCI component 840 as described with reference to FIG. 8.

At 1615, the method may include operating according to a reduced set of communication operations in accordance with the first radio frequency bandwidth and the reduced power usage level at the base station. The operations of 1615 may be performed in accordance with examples as disclosed herein. In some examples, aspects of the operations of 1615 may be performed by a communication operations component 830 as described with reference to FIG. 8.

At 1620, the method may include switching from the first radio frequency bandwidth to a second radio frequency bandwidth for communications with the base station based on a trigger event configured for switching the UE out of the first radio frequency bandwidth. The operations of 1620 may be performed in accordance with examples as disclosed herein. In some examples, aspects of the operations of 1620 may be performed by a trigger event component 835 as described with reference to FIG. 8.

Figure 17:
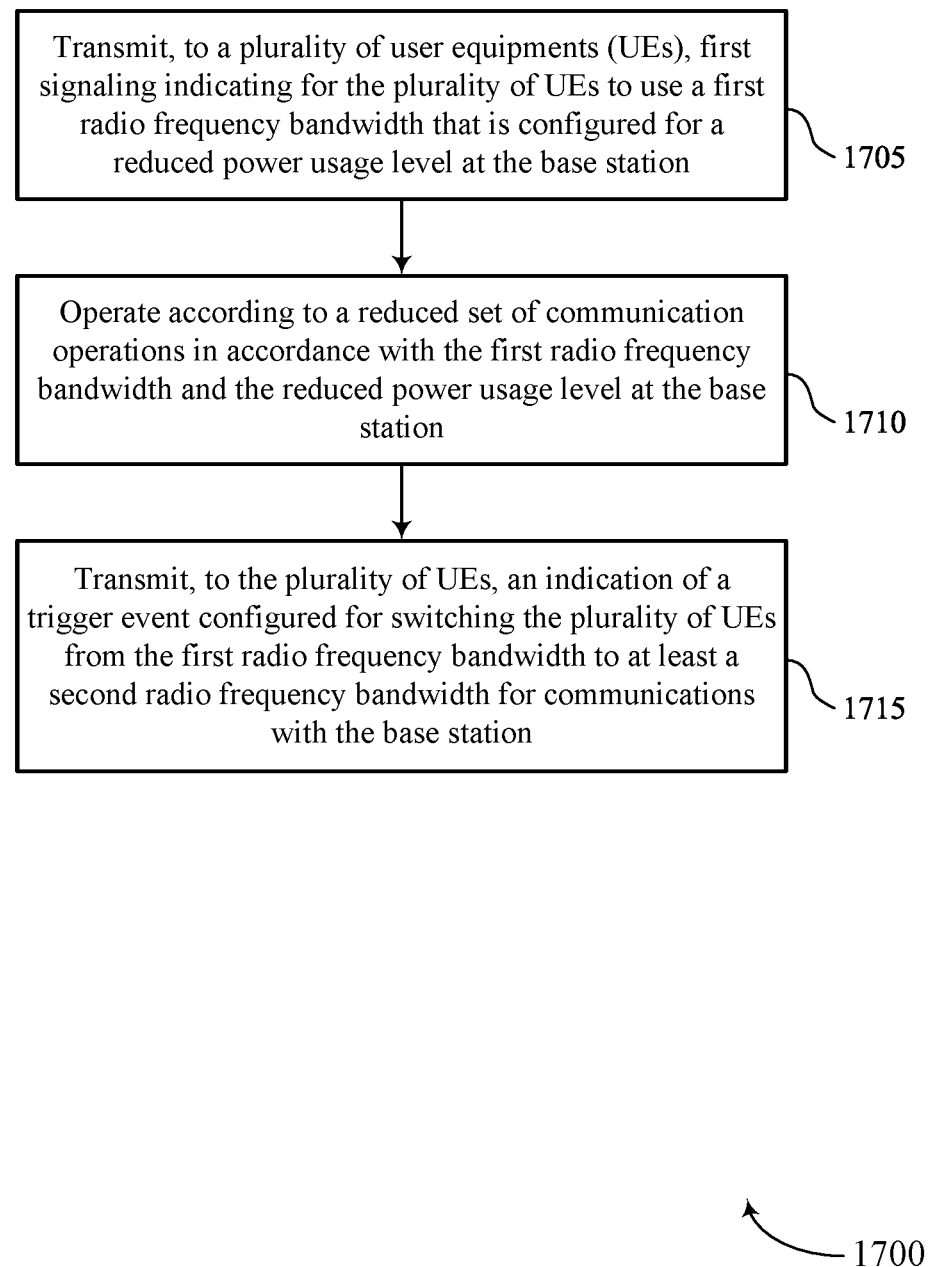

FIG. 17 shows a flowchart illustrating a method 1700 that supports BWP control for network power saving in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a set of multiple user equipments (UEs), first signaling indicating for the set of multiple UEs to use a first radio frequency bandwidth that is configured for a reduced power usage level at the base station. The operations of 1705 may be performed in accordance with examples as disclosed herein. In some examples, aspects of the operations of 1705 may be performed by a reduced power manager 1225 as described with reference to FIG. 12.

At 1710, the method may include operating according to a reduced set of communication operations in accordance with the first radio frequency bandwidth and the reduced power usage level at the base station. The operations of 1710 may be performed in accordance with examples as disclosed herein. In some examples, aspects of the operations of 1710 may be performed by a communication operations manager 1230 as described with reference to FIG. 12.

At 1715, the method may include transmitting, to the set of multiple UEs, an indication of a trigger event configured for switching the set of multiple UEs from the first radio frequency bandwidth to at least a second radio frequency bandwidth for communications with the base station. The operations of 1715 may be performed in accordance with examples as disclosed herein. In some examples, aspects of the operations of 1715 may be performed by a trigger event manager 1235 as described with reference to FIG. 12.

The following provides an overview of aspects of the present disclosure:

Aspect 1: A method for wireless communication at a UE, comprising: receiving, from a base station, signaling indicating for a plurality of UEs including the UE to use a first radio frequency bandwidth that is configured for a reduced power usage level at the base station; operating according to a reduced set of communication operations in accordance with the first radio frequency bandwidth and the reduced power usage level at the base station; and switching from the first radio frequency bandwidth to a second radio frequency bandwidth for communications with the base station based at least in part on a trigger event configured for switching the UE out of the first radio frequency bandwidth.

Aspect 2: The method of aspect 1, wherein receiving the signaling comprises: receiving a first downlink control information message comprising the signaling during an active time of a discontinuous reception cycle at the UE, wherein the first downlink control information message comprises a group-based downlink control information message corresponding to the plurality of UEs.

Aspect 3: The method of aspect 2, further comprising: monitoring for the first downlink control information message based at least in part on receiving a second downlink control information message during an inactive time of the discontinuous reception cycle comprising an indication of the first radio frequency bandwidth, receiving an indication of the reduced power usage level from the base station, a configured monitoring periodicity, or a combination thereof.

Aspect 4: The method of aspect 1, wherein receiving the signaling comprises: receiving, during an inactive time of a discontinuous reception cycle at the UE, a first downlink control information message, wherein the first downlink control information message is multiplexed with a second downlink control information message in a same search space set occasion, at least one of the first downlink control information message, the second downlink control information message, or both comprising the signaling.

Aspect 5: The method of aspect 4, wherein the first downlink control information message corresponds to a first radio network temporary identifier and the second downlink control information message corresponds to a second radio network temporary identifier different from the first radio network temporary identifier.

Aspect 6: The method of any of aspects 4 through 5, wherein the first downlink control information message comprises a first number of fields and the second downlink control information message comprises a second number of fields; and the first number of fields is less than the second number of fields.

Aspect 7: The method of any of aspects 4 through 6, wherein the second downlink control information message comprises one or more parameters of the first downlink control information message.

Aspect 8: The method of any of aspects 4 through 7, wherein the first downlink control information message comprises a cell group indication comprising a single bit indicator per cell group.

Aspect 9: The method of any of aspects 4 through 8, wherein the first downlink control information message comprises a field to update a configuration corresponding to the discontinuous reception cycle; and the field comprises a new inactive time with a duration longer than the inactive time.

Aspect 10: The method of any of aspects 1 through 9, further comprising: receiving, on a reference cell of a plurality of serving cells for the UE, a reference cell configuration for monitoring for the signaling, wherein receiving the signaling is based at least in part on the reference cell configuration.

Aspect 11: The method of any of aspects 1 through 10, wherein switching from the first radio frequency bandwidth to the second radio frequency bandwidth comprises: determining a timer corresponding to the reduced power usage level at the base station has expired, wherein: a duration of the timer is configured at the UE; and the trigger event comprises expiration of the timer.

Aspect 12: The method of any of aspects 1 through 11, wherein switching from the first radio frequency bandwidth to the second radio frequency bandwidth comprises: receiving an indication of a slot, subframe, frame, or a combination thereof in which to switch from the first radio frequency bandwidth to the second radio frequency bandwidth, wherein the trigger event is the slot, subframe, frame or the combination thereof.

Aspect 13: The method of any of aspects 1 through 12, further comprising: transmitting, to the base station and prior to operating according to the reduced set of communication operations, a feedback message based at least in part on the received signaling.

Aspect 14: The method of any of aspects 1 through 12, further comprising: transmitting, to the base station and while operating according to the reduced set of communication operations, a feedback message based at least in part on the received signaling.

Aspect 15: The method of any of aspects 1 through 14, further comprising: receiving the signaling from a reference cell of a plurality of serving cells for the UE, the reference cell comprising a primary cell for the UE, a common cell for the plurality of UEs, or both.

Aspect 16: The method of any of aspects 1 through 15, wherein operating according to the reduced set of communication operations comprises: refraining from monitoring an uplink shared channel, a downlink shared channel, an uplink control channel, a downlink control channel, one or more reference signals, one or more synchronization signal blocks, or a combination thereof.

Aspect 17: The method of any of aspects 1 through 16, wherein operating according to the reduced set of communication operations comprises: monitoring the first radio frequency bandwidth for control signaling from the base station, the control signaling indicating for the UE to switch from the first radio frequency bandwidth to the second radio frequency bandwidth.

Aspect 18: The method of any of aspects 1 through 17, wherein operating according to the reduced set of communication operations comprises: performing a random access channel procedure with a reference cell of a plurality of serving cells for the UE.

Aspect 19: The method of any of aspects 1 through 18 further comprising: receiving a configuration indicating the second radio frequency bandwidth.

Aspect 20: The method of any of aspects 1 through 19 wherein the second radio frequency bandwidth is a same radio frequency bandwidth for communications with the base station prior to receiving the signaling.

Aspect 21: The method of any of aspects 1 through 20 wherein the first radio frequency bandwidth is common to the plurality of UEs; and the second radio frequency bandwidth is specific to the UE.

Aspect 22: The method of any of aspects 1 through 21 wherein the first radio frequency bandwidth is narrower than the second radio frequency bandwidth.

Aspect 23: A method for wireless communication at a base station, comprising: transmitting, to a plurality of user equipments (UEs), first signaling indicating for the plurality of UEs to use a first radio frequency bandwidth that is configured for a reduced power usage level at the base station; operating according to a reduced set of communication operations in accordance with the first radio frequency bandwidth and the reduced power usage level at the base station; and transmitting, to the plurality of UEs, an indication of a trigger event configured for switching the plurality of UEs from the first radio frequency bandwidth to at least a second radio frequency bandwidth for communications with the base station.

Aspect 24: The method of aspect 23, wherein transmitting the first signaling comprises: transmitting a first downlink control information message comprising the first signaling during an active time of a discontinuous reception cycle at the UE, wherein the first downlink control information message comprises a group-based downlink control information message corresponding to the plurality of UEs.

Aspect 25: The method of aspect 24, further comprising: transmitting, to the plurality of UEs, a second downlink control information message during an inactive time of the discontinuous reception cycle comprising an indication of the first radio frequency bandwidth, an indication of the reduced power usage level, a monitoring precocity configuration, or a combination thereof.

Aspect 26: The method of aspect 23, wherein transmitting the first signaling comprises: transmitting, during an inactive time of a discontinuous reception cycle at the UE, a first downlink control information message, wherein the first downlink control information message is multiplexed with a second downlink control information message in a same search space set occasion, at least one of the first downlink control information message, the second downlink control information message, or both comprising the first signaling.

Aspect 27: The method of aspect 26, wherein the first downlink control information message corresponds to a first radio network temporary identifier and the second downlink control information message corresponds to a second radio network temporary identifier different from the first radio network temporary identifier.

Aspect 28: The method of any of aspects 26 through 27, wherein the first downlink control information message comprises a first number of fields and the second downlink control information message comprises a second number of fields; and the first number of fields is less than the second number of fields.

Aspect 29: The method of any of aspects 26 through 28, wherein the second downlink control information message comprises one or more parameters of the first downlink control information message.

Aspect 30: The method of any of aspects 26 through 29, wherein the first downlink control information message comprises a cell group indication comprising a single bit indicator per cell group.

Aspect 31: The method of any of aspects 26 through 30, wherein the first downlink control information message comprises a field to update a configuration corresponding to the discontinuous reception cycle; and the field comprises a new inactive time with a duration longer than the inactive time.

Aspect 32: The method of any of aspects 23 through 31, further comprising: transmitting, on a reference cell of a plurality of serving cells for the UE, a reference cell configuration for the first signaling, wherein transmitting the first signaling is based at least in part on the reference cell configuration.

Aspect 33: The method of any of aspects 23 through 32, further comprising: transmitting, to the UE, a timer configuration for switching from the first radio frequency bandwidth to the second radio frequency bandwidth, wherein the trigger event comprises expiration of a timer associated with the timer configuration.

Aspect 34: The method of any of aspects 23 through 33, wherein transmitting the indication of the trigger event comprises: transmitting an indication of a slot, subframe, frame, or a combination thereof in which to switch from the first radio frequency bandwidth to the second radio frequency bandwidth, wherein the trigger event is the slot, subframe, frame or the combination thereof.

Aspect 35: The method of any of aspects 23 through 34, further comprising: receiving, from at least one UE of the plurality of UEs and prior to operating according to the reduced set of communication operations, a feedback message based at least in part on transmitting the first signaling.

Aspect 36: The method of any of aspects 23 through 34, further comprising: receiving, from at least one UE of the plurality of UEs and while operating according to the reduced set of communication operations, a feedback message based at least in part on transmitting the first signaling.

Aspect 37: The method of any of aspects 23 through 36, further comprising: transmitting the first signaling from a reference cell of a plurality of serving cells for the UE, the reference cell comprising a primary cell for the UE, a common cell for the plurality of UEs, or both.

Aspect 38: The method of any of aspects 23 through 37, wherein operating according to the reduced set of communication operations comprises: refraining from transmitting second signaling comprising an uplink shared channel, a downlink shared channel, an uplink control channel, a downlink control channel, one or more reference signals, one or more synchronization signal blocks, or a combination thereof.

Aspect 39: The method of any of aspects 23 through 38, wherein operating according to the reduced set of communication operations comprises: transmitting, to at least one UE of the plurality of UEs, second signaling according to the first radio frequency bandwidth, the second signaling indicating for the UE to switch from the first radio frequency bandwidth to the second radio frequency bandwidth.

Aspect 40: The method of any of aspects 23 through 39, wherein operating according to the reduced set of communication operations comprises: performing a random access channel procedure with a reference cell of a plurality of serving cells for the UE.

Aspect 41: The method of any of aspects 23 through 40, further comprising: transmitting a configuration indicating the second radio frequency bandwidth.

Aspect 42: The method of any of aspects 23 through 41 wherein the second radio frequency bandwidth is a same radio frequency bandwidth for communications with the UE prior to transmitting the first signaling.

Aspect 43: The method of any of aspects 23 through 42 wherein the first radio frequency bandwidth is common to the plurality of UEs; and the second radio frequency bandwidth is specific to a UE of the plurality of UEs.

Aspect 44: The method of any of aspects 23 through 43 wherein the first radio frequency bandwidth is narrower than the second radio frequency bandwidth.

Aspect 45: An apparatus for wireless communication at a UE, comprising a processor; memory coupled with the processor; and instructions stored in the memory and executable by the processor to cause the apparatus to perform a method of any of aspects 1 through 22.

Aspect 46: An apparatus for wireless communication at a UE, comprising at least one means for performing a method of any of aspects 1 through 22.

Aspect 47: A non-transitory computer-readable medium storing code for wireless communication at a UE, the code comprising instructions executable by a processor to perform a method of any of aspects 1 through 22.

Aspect 48: An apparatus for wireless communication at a base station, comprising a processor; memory coupled with the processor; and instructions stored in the memory and executable by the processor to cause the apparatus to perform a method of any of aspects 23 through 44.

Aspect 49: An apparatus for wireless communication at a base station, comprising at least one means for performing a method of any of aspects 23 through 44.

Aspect 50: A non-transitory computer-readable medium storing code for wireless communication at a base station, the code comprising instructions executable by a processor to perform a method of any of aspects 23 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, signaling indicating for a plurality of UEs including the UE to use a first radio frequency bandwidth that is configured for a reduced power usage level at the base station;
   operating according to a reduced set of communication operations in accordance with the first radio frequency bandwidth and the reduced power usage level at the base station; and
   switching from the first radio frequency bandwidth to a second radio frequency bandwidth for communications with the base station based at least in part on a trigger event configured for switching the UE out of the first radio frequency bandwidth.

2. The method of claim 1, wherein receiving the signaling comprises:
   receiving a first downlink control information message comprising the signaling during an active time of a discontinuous reception cycle at the UE, wherein the first downlink control information message comprises a group-based downlink control information message corresponding to the plurality of UEs.

3. The method of claim 2, further comprising:
   monitoring for the first downlink control information message based at least in part on receiving a second downlink control information message during an inactive time of the discontinuous reception cycle comprising an indication of the first radio frequency bandwidth, receiving an indication of the reduced power usage level from the base station, a configured monitoring periodicity, or a combination thereof.

4. The method of claim 1, wherein receiving the signaling comprises:
   receiving, during an inactive time of a discontinuous reception cycle at the UE, a first downlink control information message, wherein the first downlink control information message is multiplexed with a second downlink control information message in a same search space set occasion, at least one of the first downlink control information message, the second downlink control information message, or both comprising the signaling.

5. The method of claim 4, wherein the first downlink control information message corresponds to a first radio network temporary identifier and the second downlink control information message corresponds to a second radio network temporary identifier different from the first radio network temporary identifier.

6. The method of claim 4, wherein:
   the first downlink control information message comprises a first number of fields and the second downlink control information message comprises a second number of fields; and
   the first number of fields is less than the second number of fields.

7. The method of claim 4, wherein the second downlink control information message comprises one or more parameters of the first downlink control information message.

8. The method of claim 4, wherein the first downlink control information message comprises a cell group indication comprising a single bit indicator per cell group.

9. The method of claim 4, wherein:
the first downlink control information message comprises a field to update a configuration corresponding to the discontinuous reception cycle; and
the field comprises a new inactive time with a duration longer than the inactive time.

10. The method of claim 1, further comprising:
receiving, on a reference cell of a plurality of serving cells for the UE, a reference cell configuration for monitoring for the signaling, wherein receiving the signaling is based at least in part on the reference cell configuration.

11. The method of claim 1, wherein switching from the first radio frequency bandwidth to the second radio frequency bandwidth comprises:
determining a timer corresponding to the reduced power usage level at the base station has expired, wherein:
a duration of the timer is configured at the UE; and
the trigger event comprises expiration of the timer.

12. The method of claim 1, wherein switching from the first radio frequency bandwidth to the second radio frequency bandwidth comprises:
receiving an indication of a slot, subframe, frame, or a combination thereof in which to switch from the first radio frequency bandwidth to the second radio frequency bandwidth, wherein the trigger event is the slot, subframe, frame or the combination thereof.

13. The method of claim 1, further comprising:
transmitting, to the base station and prior to operating according to the reduced set of communication operations, a feedback message based at least in part on the received signaling.

14. The method of claim 1, further comprising:
transmitting, to the base station and while operating according to the reduced set of communication operations, a feedback message based at least in part on the received signaling.

15. The method of claim 1, further comprising:
receiving the signaling from a reference cell of a plurality of serving cells for the UE, the reference cell comprising a primary cell for the UE, a common cell for the plurality of UEs, or both.

16. The method of claim 1, wherein operating according to the reduced set of communication operations comprises:
refraining from monitoring an uplink shared channel, a downlink shared channel, an uplink control channel, a downlink control channel, one or more reference signals, one or more synchronization signal blocks, or a combination thereof.

17. The method of claim 1, wherein operating according to the reduced set of communication operations comprises:
monitoring the first radio frequency bandwidth for control signaling from the base station, the control signaling indicating for the UE to switch from the first radio frequency bandwidth to the second radio frequency bandwidth.

18. The method of claim 1, wherein operating according to the reduced set of communication operations comprises:
performing a random access channel procedure with a reference cell of a plurality of serving cells for the UE.

19. The method of claim 1 further comprising:
receiving a configuration indicating the second radio frequency bandwidth.

20. The method of claim 1 wherein the second radio frequency bandwidth is a same radio frequency bandwidth for communications with the base station prior to receiving the signaling.

21. The method of claim 1 wherein:
the first radio frequency bandwidth is common to the plurality of UEs; and
the second radio frequency bandwidth is specific to the UE.

22. The method of claim 1 wherein the first radio frequency bandwidth is narrower than the second radio frequency bandwidth.

23. A method for wireless communication at a base station, comprising:
transmitting, to a plurality of user equipments (UEs), first signaling indicating for the plurality of UEs to use a first radio frequency bandwidth that is configured for a reduced power usage level at the base station;
operating according to a reduced set of communication operations in accordance with the first radio frequency bandwidth and the reduced power usage level at the base station; and
transmitting, to the plurality of UEs, an indication of a trigger event configured for switching the plurality of UEs from the first radio frequency bandwidth to at least a second radio frequency bandwidth for communications with the base station.

24. The method of claim 23, wherein transmitting the first signaling comprises:
transmitting a first downlink control information message comprising the first signaling during an active time of a discontinuous reception cycle at the UE, wherein the first downlink control information message comprises a group-based downlink control information message corresponding to the plurality of UEs.

25. The method of claim 23, wherein transmitting the first signaling comprises:
transmitting, during an inactive time of a discontinuous reception cycle at the UE, a first downlink control information message, wherein the first downlink control information message is multiplexed with a second downlink control information message in a same search space set occasion, at least one of the first downlink control information message, the second downlink control information message, or both comprising the first signaling.

26. The method of claim 23, further comprising:
transmitting, on a reference cell of a plurality of serving cells for the UE, a reference cell configuration for the first signaling, wherein transmitting the first signaling is based at least in part on the reference cell configuration.

27. The method of claim 23, further comprising:
transmitting, to the UE, a timer configuration for switching from the first radio frequency bandwidth to the second radio frequency bandwidth, wherein the trigger event comprises expiration of a timer associated with the timer configuration.

28. The method of claim 23, wherein transmitting the indication of the trigger event comprises:
transmitting an indication of a slot, subframe, frame, or a combination thereof in which to switch from the first radio frequency bandwidth to the second radio frequency bandwidth, wherein the trigger event is the slot, subframe, frame or the combination thereof.

29. An apparatus for wireless communication at a user equipment (UE), comprising:
a processor;
memory coupled with the processor; and
instructions stored in the memory and executable by the processor to cause the apparatus to:

receive, from a base station, signaling indicating for a plurality of UEs including the UE to use a first radio frequency bandwidth that is configured for a reduced power usage level at the base station;

operate according to a reduced set of communication operations in accordance with the first radio frequency bandwidth and the reduced power usage level at the base station; and switch from the first radio frequency bandwidth to a second radio frequency bandwidth for communications with the base station based at least in part on a trigger event configured for switching the UE out of the first radio frequency bandwidth.

30. An apparatus for wireless communication at a base station, comprising:

a processor;

memory coupled with the processor; and instructions stored in the memory and executable by the processor to cause the apparatus to:

transmit, to a plurality of user equipments (UEs), first signaling indicating for the plurality of UEs to use a first radio frequency bandwidth that is configured for a reduced power usage level at the base station;

operate according to a reduced set of communication operations in accordance with the first radio frequency bandwidth and the reduced power usage level at the base station; and transmit, to the plurality of UEs, an indication of a trigger event configured for switching the plurality of UEs from the first radio frequency bandwidth to at least a second radio frequency bandwidth for communications with the base station.

* * * * *